United States Patent [19]

Pavlath

[11] Patent Number: 4,915,503

[45] Date of Patent: Apr. 10, 1990

[54] FIBER OPTIC GYROSCOPE WITH IMPROVED BIAS STABILITY AND REPEATABILITY AND METHOD

[75] Inventor: George A. Pavlath, Thousand Oaks, Calif.

[73] Assignee: Litton Systems, Inc., Beverly Hills, Calif.

[21] Appl. No.: 91,972

[22] Filed: Sep. 1, 1987

[51] Int. Cl.⁴ .............................................. G01B 9/02
[52] U.S. Cl. .................................................. 356/350
[58] Field of Search ........................................ 356/350

[56] References Cited

U.S. PATENT DOCUMENTS

| | | | |
|---|---|---|---|
| 3,102,953 | 9/1963 | Wallace | 356/350 |
| 3,395,270 | 7/1968 | Speller | 364/453 |
| 3,411,849 | 11/1968 | Aronowitz | 356/350 |
| 3,503,005 | 3/1970 | Mocker | 356/350 |
| 3,512,890 | 5/1970 | McLaughlin | 356/350 |
| 3,625,589 | 12/1971 | Snitzer | 350/96 |
| 3,627,422 | 12/1971 | Chodorow | 356/350 |
| 3,645,603 | 2/1972 | Smith | 350/149 |
| 3,697,887 | 10/1972 | Lee et al. | 331/94.5 |
| 3,743,969 | 7/1973 | Hutchings | 356/350 |
| 3,807,866 | 4/1974 | Zingery | 356/350 |
| 3,827,000 | 7/1974 | Matsushita et al. | 332/7.51 |
| 3,854,819 | 12/1974 | Andringa | 356/350 |
| 4,013,365 | 3/1977 | Vali et al. | 350/106 |
| 4,039,260 | 8/1977 | Redman | 350/106 |
| 4,153,331 | 5/1979 | Cross | 350/96.20 |

(List continued on next page.)

FOREIGN PATENT DOCUMENTS 1807247 9/1971 Fed. Rep. of Germany ...... 356/350

OTHER PUBLICATIONS

Davis, J. L. and Ezekiel, S., "Techniques for Shot-Noise-Limited Inertial Rotation Measurement Using a Multiturn Fiber Square Interferometer", *SPIE*, vol. 157, (1978), p. 131.

Fujii, "Optical Fibers with Very Fine Layered Dielectrics", *App. Optics*, vol. 25, No. 7, 1 Apr. 1986, pp. 1061-1065.

Kinter, E. C., "Polarization Problems in Optical Fiber Gyroscopes", *Applied Optics*, vol. 18, No. 9, pp. 78-81.

Lefevre et al., "Progress in Optical Fiber Gyroscopes Using Integrated Optics", p. 12.

Ulrich, R., "Polarization Stabilization on Single-Mode Fiber", *Applied Physics Letters*, 35(11), 12/01/79.

Pavlath et al., "Fiber Optic Gyroscopes: Advances and Future Developments", *Navigation: Journal of the Institute of Navigation*, vol. 31, No. 2, Summer 1984, pp. 70-83.

Mohr, F. A. & Scholz, U., "Polarization Control for an Optical Fiber Gyroscope", *Fiber Optic Rotation and Related Technology*, Springer Verlag, 1982, pp. 163-168.

Wilson et al., "Magnetostrictive Fiber-Optic Sensor System for Detecting DC Magnetic Fields", *Optics Letters*, Jun. 1983, vol. 8, No. 6, pp. 333-335.

(List continued on next page.)

Primary Examiner—Vincent P. McGraw
Attorney, Agent, or Firm—Lynn & Lynn

[57] ABSTRACT

A fiber gyroscope provides improved bias stability and repeatability and has a greatly reduced polarizer extinction ratio requirement compared previous devices. This fabrication technique is compatible with both an all fiber gyroscope configuration and an integrated optics or bulk optics device. The present invention comprises a substrate that is preferably formed of fused silica. A pair of optical fibers, or two lengths of one fiber, are mounted to the substrate, and first planar surfaces are formed in the cladding. Optical couplers, polarizers and other components used in forming the rotation sensor are formed on the planar cladding surfaces of the fibers. Polarizers formed on the fibers have a transmission axis aligned with an axis of birefringence of the fiber to remove undesired linear polarization components from optical signals guided by the fibers while permitting a desired linear polarization component to propagate unattenuated. A sensing coil of optical fiber is arranged to guide light between the first and second optical fibers, the first and second optical fibers and the optical coupler cooperating to introduce counterpropagating light waves in the sensing coil.

19 Claims, 15 Drawing Sheets

U.S. PATENT DOCUMENTS

| | | |
|---|---|---|
| 4,265,541 | 5/1981 | Le Clerc et al. ............... 356/350 |
| 4,268,116 | 5/1981 | Schmadel et al. ............ 350/96.29 |
| 4,299,490 | 11/1981 | Cahill et al. .................... 356/350 |
| 4,372,646 | 2/1983 | Strahan et al. ............... 350/96.31 |
| 4,372,685 | 2/1983 | Ulrich ............................. 356/350 |
| 4,386,822 | 7/1983 | Bergh ........................... 350/96.15 |
| 4,389,090 | 6/1983 | LeFevre ........................ 350/96.29 |
| 4,410,275 | 10/1983 | Shaw et al. .................... 356/350 |
| 4,456,377 | 7/1984 | Shaw et al. .................... 356/350 |
| 4,461,574 | 6/1984 | Shaw et al. .................... 356/350 |
| 4,469,397 | 9/1984 | Shaw et al. .................. 350/96.15 |
| 4,473,270 | 9/1984 | Shaw ............................ 350/96.15 |
| 4,480,915 | 11/1984 | Arditty et al. .................. 356/350 |
| 4,493,528 | 1/1985 | Shaw et al. .................. 350/96.15 |
| 4,494,969 | 1/1985 | Bhagavatula .................... 65/3.12 |
| 4,529,312 | 7/1985 | Pavlath et al. ................. 356/350 |
| 4,529,313 | 7/1985 | Petermann et al. ............ 356/350 |
| 4,529,426 | 7/1985 | Pleibel et al. .................... 65/3.11 |
| 4,530,097 | 7/1985 | Stokes et al. ........................ 372/6 |
| 4,549,781 | 10/1985 | Bhagavatula et al. ......... 350/96.30 |
| 4,549,806 | 10/1985 | Marten et al. ................. 356/350 |
| 4,552,578 | 11/1985 | Anderson ............................ 65/29 |
| 4,557,742 | 12/1985 | Thigpen ............................... 65/2 |
| 4,561,871 | 12/1985 | Berkey ............................. 65/3.11 |
| 4,575,187 | 3/1986 | Howard et al. ............... 350/96.33 |
| 4,588,296 | 5/1986 | Cahill et al. ..................... 356/350 |
| 4,589,728 | 5/1986 | Dyott et al. ................... 350/96.30 |
| 4,621,925 | 11/1986 | Masuda et al. ................. 356/350 |
| 4,637,722 | 1/1987 | Kim ................................. 356/350 |
| 4,653,917 | 3/1987 | Moeller et al. .................. 356/350 |
| 4,671,658 | 6/1987 | Shaw et al. ..................... 356/350 |
| 4,702,600 | 10/1987 | Handrich et al. ............... 356/350 |
| 4,717,256 | 1/1988 | Ensley et al. .................... 356/350 |

OTHER PUBLICATIONS

Risk et al., "Single-Sidedband Frequency Shifting in Birefringent Optical Fiber", vol. 478, *Fiber Optic & Laser Sensors 2 SPIE*, (1984), pp. 91–97.

Campbell et al., "Rotating-Waveplate Optical-Frequency Shifting in Lithium Niobate", *IEEE Journal of Quantum Electronics*, vol. QE-7, No. 9, Sep. 1971, pp. 450–457.

Vali et al., "Rapid Communications", *App. Opt.*, May 1978, vol. 16, No. 5, pp. 1099–1102.

Goss et al., "Fiber Optic Rotation Sensors (FORS) Signal Detection & Processing", *SPIE*, vol. 139, (1878), pp. 76–87.

Vali et al., "Fresnel-Fizeau Effecy in a Rotating Optical Fiber Ring Interferometer", *Applied Optics*, 16,2605, Oct. 16, 1977.

Moss et al., "Photon-Noise Limited Transducer for Gravitational Antenna", *Applied Optics*, 10, 2495, 1971.

Stone, J. M., "Radiation and Optics", McGraw-Hill, N.Y., 1963, pp. 405–408 and p. 412.

Vali et al., "Ring Interferometer 950 m Long", *Applied Optics*, vol. 16, No. 2, Feb. 1977, pp. 290–291.

Lamouroux et al., "Polarization Effect in Optical-Fiber Ring Resonators", *Optics Letters*, 1982, vol. 7, No. 8, pp. 391–393.

Cahill et al., "Phase-Nulling Fiber-Optic Laser Gyro", *Optics Letters*, 1979, vol. 4, No. 3, pp. 93–95.

Cumming, "The Serrodyne Frequency Translator", *Proceedings of the IRE*, Feb. 1957, pp. 175–186.

Gruchmann et al., "Fibre-Optic Polarizers with Extinction Ratio", Optical Communication Ninth European Conference on Optical Comm.-ECOC 83, 23–26, Oct. 83, pp. 305–308.

FIBER OPTIC GYROSCOPE WITH IMPROVED BIAS STABILITY AND REPEATABILITY AND METHOD

BACKGROUND OF THE INVENTION

This invention relates generally to rotation sensors and particularly to fiber optic rotation sensors. Still more particularly, this invention relates to fiber optic rotation sensors having a high bias stability and repeatability.

A fiber optic ring interferometer typically comprises a loop of fiber optic material that guides counter-propagating light waves. After traversing the loop, the counter-propagating waves are combined so that they constructively or destructively interfere to form an optical output signal. The intensity of the optical output signal varies as a function of the interference, which is dependent upon the relative phase of the counterpropagating waves.

Fiber optic ring interferometers have proven to be particularly useful for rotation sensing. Rotation of the loop creates a relative phase difference between the counter-propagating waves in accordance with the well known Sagnac effect. The amount of phase difference is a function of the angular velocity of the loop. The optical output signal produced by the interference of the counter-propagating waves varies in intensity as a function of the rotation rate of the loop. Rotation sensing is accomplished by detecting the optical output signal and processing it to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper and lower limits to be measured is approximately $10^9$.

It is well known that in many fiber optic systems it may be desirable to have light of a known polarization state at selected points. The output of some components is polarization dependent. Therefore, having a known polarization input to such components minimizes errors. The state of polarization is particularly important in a device such as an optical fiber rotation sensor. In a polarized optical fiber rotation sensing system, drift errors due to changes in polarization are determined by the quality of the polarizer.

Some familiarity with polarization of light and propagation of light within an optical fiber will facilitate an understanding of the present invention. Therefore, a brief description of the concepts used to describe the propagation and polarization of a light wave in a fiber will be presented.

An optical fiber comprises a central core and a surrounding cladding. The refractive index of the cladding is greater than that of the core. The core diameter is so small that light incident upon the core-cladding interface remains in the core by internal reflections.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For optical fiber, where the guided wave is confined to a structure having a circular cross section of fixed dimensions, only fields having certain frequencies and spatial distributions will propagate without severe attenuation. The waves having field components that propagate unattenuated are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. If only the electric field vector is perpendicular to the direction of propagation, which is usually called the optic axis, then the wave is a tranverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode.

None of the normal modes require a definite direction of the field components. In a TE mode, for example, the electric field may be in any direction that is perpendicular to the optic axis. The direction of the electric field vector in an electromagnetic wave is the polarization of the wave. In general, a wave will have random polarization in which there is a uniform distribution of electric field vectors pointing in all directions permissible for a given mode. If all the electric field vectors in a wave point in only a particular direction, the wave is linearly polarized. If the electric field consists of two orthogonal electric field components of equal magnitude phase shifted 90° from each other, the electric field is circularly polarized, because the net electric field is a vector that rotates around the propagation direction at an angular velocity equal to the frequency of the wave. If the two linear polarizations are unequal or phased other than 90° apart, the wave has elliptical polarization. In general, any arbitrary polarization can be represented by the sum of two orthogonal linear polarizations, two oppositely directed circular polarizations or two counter rotating elliptical polarizations that have orthogonal major axes.

The boundary between the core and cladding is a dielectric interface at which certain well-known boundary conditions on the field components must be satisfied. For example, the component of the electric field parallel to the interface must be continuous. A single mode optical fiber propagates electromagnetic energy having an electric field component perpendicular to the core-cladding interface. Since the fiber core has an refractive index greater than that of the cladding and light impinges upon the interface at angles greater than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the evanescent field.

The velocity of an optical signal depends upon the refractive index of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a velocity difference between the two polarizations.

Circular birefringence, linear birefringence, and elliptical birefringence are each described with reference to different polarization modes. If a material exhibits circular birefringence, the polarization of a light wave is expressed as a combination of two counter-rotating components. One of the circular polarizations is referred to as "right-hand circular" while the other is referred to as "left-hand circular". In a non-birefringent material both right hand and left hand circular polarizations travel at the same velocity. The counterrotating electric field vectors of the circular polarized components of the light represent the polarization modes for circular birefringence. If the light is linearly polarized, the circular polarization vectors are in phase with one another and are of equal amplitude. If the light is elliptically polarized, the circular polarization vectors are of unequal amplitudes or phase. In general, elliptically polarized light may have varying degrees of ellipticity; and the polarization may range from linearly polarized at one extreme to circularly polarized at the other extreme.

In a circularly birefringent material, the velocity of propagation of one circular polarization vector is greater than the velocity of propagation of the counter-rotating polarization vector. Similarly, in a material that is linearly birefringent, the propagation velocity of the light in one of the linearly polarized modes is greater than the propagation velocity of the light in the other normal linearly polarized mode. Elliptical birefringence results when both linear birefringence and circular birefringence exist at a point in a material through which the light wave is propagating. The elliptical birefringence affects the polarization of light in a complex manner which depends, in part, upon the relative magnitudes of the linear birefringence and the circular birefringence.

In summary, any polarized light can be represented by two circularly polarized waves having proper phase and amplitude, two either elliptically rotating components or perpendicular linearly polarized electric field components.

Bias error is the primary source of error in using fiber optic Sagnac rings as rotation sensors. The bias of a rotation sensor is the signal output when there is no signal input. In the bias is constant, then it may be subtracted from the output signal when there is a signal input to determine the response of the rotation sensor to the input signal. However, the bias does not remain constant over time and temperature variations.

The principal source of bias error in fiber gyroscopes results from an imperfect polarizer and polarization cross coupling in the fiber. An ideal polarizer should have an infinite extinction ratio. The extinction ratio of a polarizer is the ratio of the intensity of the undesired polarization in the output signal to its intensity in the input signal. This error source was first identified by Kintner, Opt. Lett., Vol. 20, No. 6, p. 154(1981). Polarization instability manifests itself in optical interferometric systems in a manner analogous to signal fading in classical communications systems.

The maximum bias error may be expressed as $$\phi_e = 2\epsilon |a_B/a_A| |t_{xy}/t_{xx}|, \quad (1)$$

where $\phi_e$ is the maximum phase bias error, $\epsilon$ is the polarizer field extinction ratio, $a_A$ and $a_B$ are the fields input to the polarizer from the source orthogonal and parallel to the polarizer transmission axis, $t_{xy}$ is the polarization cross coupling in the fiber loop, and $t_{xx}$ is the polarization retention for the fiber loop. Equation (1) is modified for fiber gyroscopes in which the input light is not completely polarized or if the input light is depolarized in the gyroscope. In such cases $a_B$ represents the electric field component input to the polarizer normal to the transmission axis and coherent with the electric field aligned with the transmission axis, and $t_{xy}$ represents the coherent polarization cross coupling in the fiber loop.

Fiber optic gyroscopes operating with polarized light require polarizers having extinction ratios in excess of 100 dB to keep bias errors below 0.01 deg/hr. Fiber optic gyroscopes using unpolarized light require extinction ratios in the 60–100 dB range and require the use of high quality polarization maintaining (PM) fiber throughout the gyroscope.

A linear polarization state in a fiber optic rotation sensor is typically achieved with some type of linear polarizer such as the fiber optic polarizer described in U.S. Pat. No. 4,386,822 to Bergh. The polarization state input to the polarizer is arbitrary in general. The polarizer couples light of undesired polarizations out of the fiber and permits light having only a selected desired polarization to propagate through the fiber. Bergh discloses a fiber optic polarizer including a length of optical fiber mounted in a curved groove in a quartz substrate. The substrate and a portion of the optical fiber are ground and polished to remove a portion of the cladding from the fiber to form an interaction region. The portion of the fiber in the groove is convexly curved as viewed looking toward the polished surface. The birefringent crystal is mounted on the substrate over the interaction region in close proximity to the core of the fiber optic material. The crystal is positioned to partially intersect the path of light propagating in the optical fiber so that evanescent field coupling couples light of undesired polarizations from the optical fiber into the crystal.

The birefringent crystal has different wave velocities for waves of different polarizations. With polarizations for which the wave velocity in the crystal is less than the wave velocity in the optical fiber, the light carried by the optical fiber excites a bulk wave in the crystal, which causes light to escape from the optical fiber into the crystal. No bulk wave is excited in the crystal for polarizations having wave velocities in the crystal greater than in the fiber so that light having such polarizations remains guided within the optical fiber. The refractive indices of the crystal are such that a wave having a polarization along one of the principal axes of the crystal will propagate more slowly in the crystal than the optical fiber; and a wave having a polarization along a second principal axis will propagate at a greater speed in the crystal than in the optical fiber.

An improved apparatus for producing light of a known polarization includes a polarization controller placed in the fiber between the light source and the polarizer with the polarization controller being adjusted to provide light of a desired polarization for input into the polarizer. However, in a typical system the polarization state input to the polarization controller varies due to the environmental sensitivities of the optical fiber. Variations in temperature and pressure, vibrations, and aging of the materials may cause significant changes in the polarization output from the polarization controller to the polarizer. Therefore, in a system which includes a polarization controller fixed to vary the polarization of light input by a predetermined amount, the time varying polarization of the light input to the polarization controller causes signal fading.

Other problems associated with prior polarizers are the result of using naturally occurring crystals. Each naturally occurring crystal has only certain refractive indices determined by the crystalline structure, therefore naturally occurring crystals may not have the desired refractive indices. Another difficulty with naturally occurring crystals involves adequately bonding them to the substrate. The crystals are not environmentally stable, which is still another source of error.

A second improved polarizer includes a feedback system for detecting the light coupled out of the fiber, which represents an error signal. The error signal is used to adjust the polarization of the light input to the polarizer to minimize the amount of light coupled out of the system.

The effectiveness of such polarizers is highly dependent upon the refractive index of the crystal. Unfortunately, the refractive indices of birefringent crystals are highly temperature-sensitive. In order to be suitable for inertial guidance applications, a rotation sensor must have a high degree of temperature stability because such rotation sensors must be operable over a range of temperature from $-55$ degrees Celsius to $+125$ degrees Celsius, according to standard specifications.

Making stable polarizers with 100+ dB extinction ratios is difficult and using high quality polarization maintaining fiber throughout the gyroscope is expensive due to the high cost of the fiber. However, significant reductions in polarizer extinction ratio requirements are possible if the light incident on the polarizer normal to the transmission axis has a low degree of coherence with the light parallel to the transmission axis and if the fiber loop has small coherent cross coupling.

The coherence between the input components of the electric field referenced to the polarizer axis and coherent cross coupling in the loop can be reduced by using a polarization maintaining fiber and a broadband source. Coherence still results if the principal axes of the fibers are not aligned precisely with the polarizer axis. Aligning the fiber axes with the polarizer axis is difficult with fiber because of the difficulty in locating the principal axis and in maintaining the principal axis in a known orientation during fabrication of the gyroscope.

Light launched coherently into both axes of a polarization maintaining fiber will have its coherence reduced to 1% in a distance of 0.3 to 1.0 meter. Longer lengths of fiber will not reduce the coherence below 1% because of competing processes which restore the coherence due to waveguide imperfections and differential loss between the two polarizations. These sources are essentially beyond the control of the manufacturer. The only way to reduce the coherence between the two polarizations is to increase the birefringence of the polarization maintaining fiber. This increased birefringence causes the polarizations to lose coherence in a shorter distance and prevents the competing processes from building up to a high level. This results in a smaller degree of coherence between the polarizations.

Significantly increasing the birefringence of the polarization maintaining fiber is not practical at the present time. Such fibers usually have a stress-induced birefringence or have an elliptical core, which provides birefringence. Additional stress induced birefringence would shatter the fiber, and highly ellipsoidal cores would cause unacceptably high loss.

Precise alignment of the polarizer axes with the waveguide principal axes and increased birefringence resulting in a lower degree of coherence between the polarizations can be realized by fabricating the loop coupler and polarizer on an $LiNbO_3$ substrate using integrated optical techniques. The polarization uses high quality (i.e., high extinction ratio) polarization maintaining fiber in the fiber loop and between an SLD/photodetector and the $LiNbO_3$ chip. Optical damage is still a problem in $LiNbO_3$. The long term stability of integrated optics circuits in $LiNbO_3$ is still in serious question. In addition, the high scattering loss (0.1-0.5 dB/cm) in integrated optics circuits in $LiNbO_3$ limits the performance of such fiber optic gyroscopes in terms of noise, bias error, and scale factor error.

SUMMARY OF THE INVENTION

The present invention provides a configuration and a fabrication technique for a fiber gyroscope with improved bias stability and repeatability and a greatly reduced polarizer extinction ratio requirement. A fiber optic gyroscope according to the invention requires a polarizer having an extinction ratio of only 20-50 dB. This fabrication technique is compatible with an all fiber gyroscope configuration with no integrated optics or bulk optics components. However, this invention is not limited to continuous fibers so that it can be used in fiber optic gyroscopes having the components spliced together.

A fiber optic rotation sensor according to the present invention comprises a substrate that is preferably formed of fused silica, a first optical fiber mounted to the substrate, a first planar cladding surface formed on a length of the first optical fiber, a second optical fiber mounted to the substrate, a second planar cladding surface formed on a length of the second optical fiber, a first optical coupler formed between the first and second optical fibers, means for introducing an optical signal into the first optical fiber, and a reciprocity polarizer formed on the planar cladding surface of the first optical fiber. The polarizer has a transmission axis aligned with an axis of birefringence of the first optical fiber to interact with the first optical fiber to remove an undesired linear polarization component from optical signals guided by the first optical fiber while permitting a desired linear polarization component to propagate unattenuated in the first optical fiber. A sensing coil of optical fiber is arranged to guide light between the first and second optical fibers, the first and second optical fibers and the optical coupler cooperating to introduce counterpropagating light waves in the sensing coil.

The fiber optic rotation sensor according to the present invention may further comprise a third optical fiber having a central core and a surrounding cladding mounted to the substrate. A length of the third optical fiber has a portion of the cladding removed therefrom to form a third planar cladding surface thereon. A second optical coupler is formed between the first and third optical fibers, and means for stabilizing the frequency of the optical signal is connected between the second optical coupler and the optical signal source.

The fiber optic rotation sensor according to the present invention may further comprise a first form birefringent polarizer formed on the substrate and the first cladding surface such that the first optical coupler is between the first form birefringent polarizer and the reciprocity polarizer. A second form birefringent polarizer may be formed on the first cladding surface such that the second optical coupler is between the second form birefringent polarizer and the reciprocity polarizer.

The reciprocity polarizer may comprise at least one layer of a material deposited on the first planar cladding surface such that the polarizer transmission axis is self aligned with the axis of birefringence of the first fiber. The polarizer may further comprise a plurality of dielectric layers of different refractive indices.

The reciprocity polarizer may also comprise a core surface formed at a location on the first optical fiber from which all of the cladding and a portion of the core have been removed, and a form birefringent stack placed on the core surface. The fiber optic polarizer may comprise a metal film formed on the core surface. A dielectric layer may be placed between the metal layer and the core surface.

The method according to the present invention for forming a fiber optic rotation sensor comprises the steps of forming a substrate, mounting a first optical fiber having a central core and a surrounding cladding on the substrate, polishing the first fiber to remove part of the cladding therefrom to form a first planar cladding surface thereon, mounting a second optical fiber having a central core and a surrounding cladding on the substrate, polishing the second optical fiber to remove a portion of the cladding therefrom to form a second planar cladding surface thereon, forming a first optical coupler between the first and second optical fibers, introducing an optical signal into the first optical fiber, and forming a reciprocity polarizer on the planar cladding surface of the first optical fiber. The polarizer has a transmission axis aligned with an axis of birefringence of the first optical fiber to interact with the first optical fiber to remove an undesired linear polarization component from optical signals guided by the first optical fiber while permitting a desired linear polarization component to propagate unattenuated in the first optical fiber and arranging a sensing coil of optical fiber to guide light between the first and second optical fibers, the first and second optical fibers and the second optical coupler cooperating to introduce counterpropagating light waves in the sensing coil The method of according to the present invention may further comprise the steps of mounting a third optical fiber having a central core and a surrounding cladding to the substrate, removing a portion of the cladding from a length of the third optical fiber to form a third planar cladding surface thereon, forming a second optical coupler between the first and third optical fibers such that the polarizer is between the first and second optical couplers, and stabilizing the frequency of the optical signal connected between the second optical coupler and the optical signal source.

The method may further comprise the steps of forming a first form birefringent polarizer on the substrate and the first cladding surface such that the first optical coupler is between the first form birefringent polarizer and the reciprocity polarizer and forming a second form birefringent polarizer on the first cladding surface such that the second optical coupler is between the second form birefringent polarizer and the reciprocity polarizer.

The method according to the present invention may include the step of forming the polarizer to have at least one layer of a material deposited on the first planar cladding surface such that the polarizer transmission axis is self aligned with the axis of birefringence of the first fiber. The method may include the step of forming the polarizer to comprise a plurality of dielectric layers of different refractive indices.

The method according to the present invention may include the steps of forming a core surface at a location on the first optical fiber from which all of the cladding and a portion of the core have been removed, and placing a form birefringent stack on the core surface. The method may also include the steps of forming a core surface formed at a location on the first optical fiber from which all of the cladding and a portion of the core have been removed, and forming a metal film on the core surface. The method may further include the step of forming the polarizer to comprise a dielectric layer between the metal layer and the core surface.

DESCRIPTION OF THE PREFERRED EMBODIMENT

I. Introduction

Figure 1:
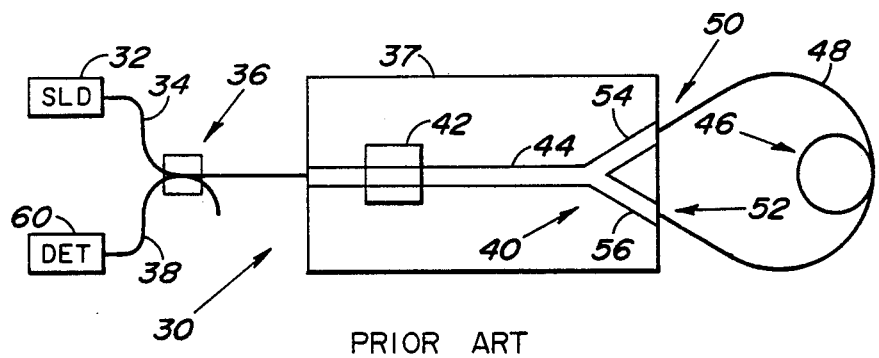
FIG. 1 illustrates a prior art optical gyroscope including a lithium niobate chip.

Referring to FIG. 1, a brief description of a prior art optical gyroscope 30 is presented for the purpose of illustrating the advantages of the present invention over the prior art. A superluminescent diode light source 32 supplies light to an optical fiber 34. The light propagates to a directional coupler 36 that couples light from the fiber 34 to an optical fiber 38. Light from the source 32 that remains in the fiber 34 propagates from the coupler 36 to a substrate 37 formed from a lithium niobate chip. The length of fiber 34 between the coupler 36 and the substrate 37 is sometimes referred to as a spatial filter. A Y-shaped coupler 40 is formed in the substrate 37 by well-known doping techniques. A polarizer 42 is formed as a superstrate over a first leg 44 of the coupler 40. A loop 46 of an optical fiber 48 has its ends 50 and 52 connected to a pair of legs 54 and 56, respectively of the coupler 40. Therefore, the loop 46 guides counter-propagating light beams therein. The waves impinge upon the legs 54 and 56 and are coupled back into the fiber 34. These beams combine and interfere in the coupler leg 44 to form a fringe pattern indicative of the rotation of the loop 46 about its longitudinal axis. The coupler 36 couples a portion of the interfering waves into the fiber 38. A detector 60 receives light from a fiber 38 and forms an electrical signal that is indicative of the rotation of the loop 46.

Figure 12:
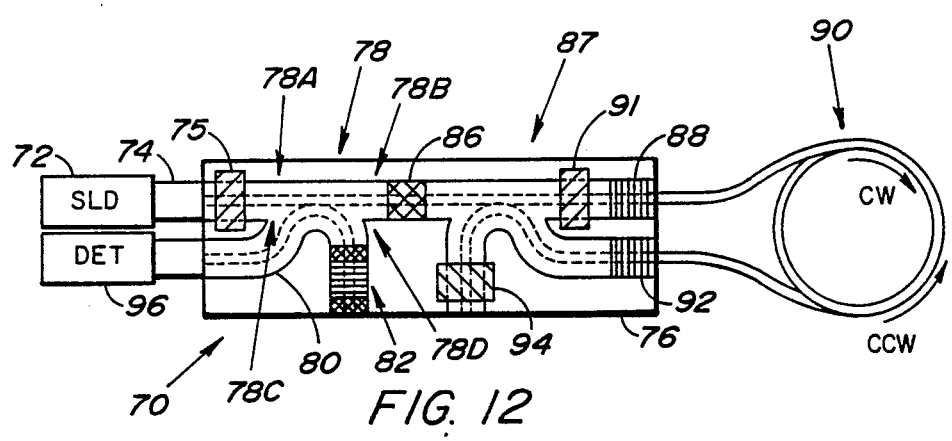
FIG. 12 is a plan view of a complete fiber optic gyroscope system according to the present invention including the substrate and fibers of FIG. 8 mounted thereto.

Referring to FIG. 12, a fiber optic gyroscope 70 according to the present invention includes an optical source 72 that preferably is a superluminescent diode (SLD) that produces coherent light in a broad frequency band. Using the SLD in the fiber optic gyroscope 70 reduces the Kerr effect, which causes errors when an optical source that produces a narrow frequency is used in such devices.

The source 72 provides an optical signal input to an optical fiber 74, which is mounted to a substrate 76 that preferably comprises fused silica. The optical input signal then initially propagates past a form birefringent polarizer 75 formed on the substrate 76 adjacent the fiber 74. The signal propagates in the fiber 74 to an optical coupler 78 that couples light between the fiber 74 and an optical fiber 80. A portion of the light from the source 72 enters the fiber 80 and propagates past a wavelength control device 82 that may be formed on the substrate 76.

Light from the source 72 remaining in the fiber 74 propagates past a reciprocity polarizer 86 formed on the substrate 76 and then propagates to a fiber optic directional coupler 87. Light that travels through the coupler 87 without cross coupling then propagates past a form birefringent polarizer 91 formed on the substrate 76 adjacent the fiber 74. After traversing the region of the fiber 74 adjacent the form birefringent polarizer 91, the beam impinges upon a phase modulator 88 that is also preferably formed on the substrate 76. The phase modulated light signal then travels clockwise through a coil 90 formed in the optical fiber 74. An arrow labeled CW indicates the clockwise wave. The coupler 87 preferably acts as a 50/50 beam splitter by cross coupling 50% of the light incident thereon from the left into the coil 90 to form a counterclockwise beam. After traversing the coil 90, the clockwise beam propagates past a frequency shifter 92 and then impinges upon the coupler 87 from the right as viewed in FIG. 12. An arrow labeled CCW indicates the counterclockwise wave. The counterclockwise beam propagates past the frequency shifter 92 before entering the coil 90.

The phase modulator 88 phase modulates the counterclockwise beam after it has traversed the coil 90. The phase modulated CCW beam then impinges upon the coupler 87 from the right. Half of the counterclockwise beam propagates straight through the coupler 87 toward the reciprocity polarizer 86. Half of the clockwise beam cross couples in coupler 87 and travels toward the reciprocity polarizer 86. The half of the clockwise beam that travels straight through the coupler 87 and the half of the counterclockwise beam that cross couples impinge upon an absorbing pad 94, which prevents this light from either exiting the fiber 74 or from reflecting back into the coil 90.

Portions of the two beams combine in the coupler 87 and form an interference pattern. The combined beans propagate past the reciprocity polarizer 86 to the coupler 78, which cross couples a portion of the interfering beams into the fiber 80 as a wave traveling to the left as viewed in FIG. 12. The interference pattern impinges upon a detector 96 that forms an electrical signal indicative of the phase difference between the clockwise and counterclockwise beams. This phase difference is related to the rotation rate of the coil about its longitudinal, or sensing, axis.

The components of the fiber optic gyroscope 70 and methods for fabricating them on the substrate 76 are described in detail subsequently. The detailed description of the invention then explains the method of operation of the fiber optic gyroscope 70.

II. COMPONENTS OF THE FIBER OPTIC GYROSCOPE 70

A. The Fiber Optic Coupler 78

The couplers 78 and 87 preferably are substantially identical; therefore, only the coupler 78 is described in detail.

Figure 2:
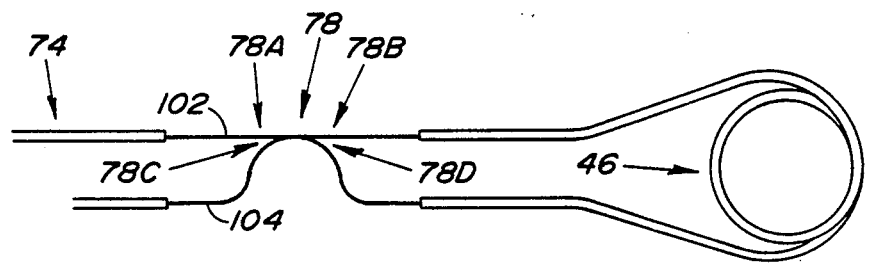
FIG. 2 illustrates a coil of optical fiber and a pair of adjacent lengths of bare fiber having the jacketing removed therefrom.
Figure 4:
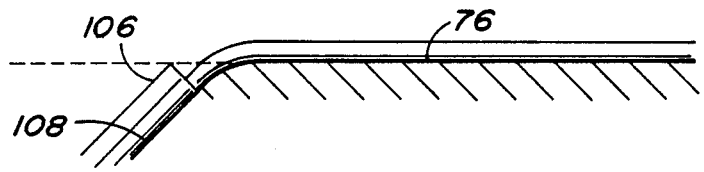
FIG. 4 illustrates a tapered edge of the substrate of FIG. 3 and a portion of the bare fiber and a portion of the jacketed fiber mounted to the edge of the substrate.

Referring to FIG. 2, two lengths 102 and 104 of ordinary non-polarization maintaining fiber, or two sections of the fiber 74, are stripped of their jackets 106 and 107 over a distance of a several centimeters. FIG. 4 shows a side view of an edge 108 of the substrate 76. As shown in FIG. 4, the ends of the substrate 76 are preferably tapered to permit the fiber jacket 106 to be below the level of the top of the substrate 76. FIG. 4 shows only the jacket 106, but the technique illustrated in FIG. 4 is also used to mount the fiber portion 104 to the substrate 76. The jackets 106 and 107 are then attached to the substrate 76 with a suitable bonding agent, such as epoxy resin.

Figure 3:
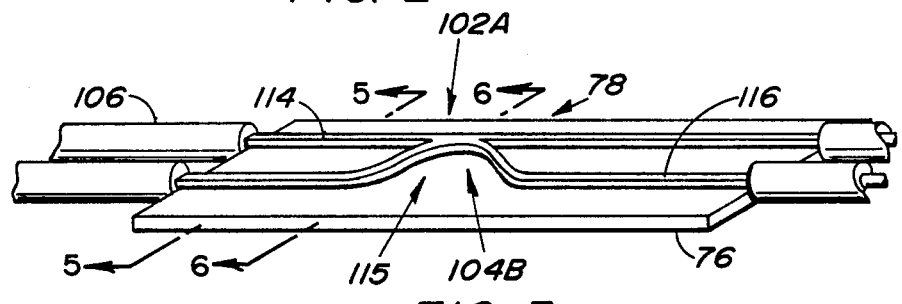
FIG. 3 illustrates the lengths of bare fiber of FIG. 2 mounted to a substrate and joined to form an optical coupler.
Figure 5:
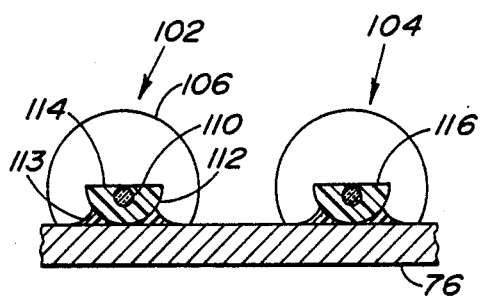
FIG. 5 is a cross sectional view along line 5—5 of FIG. 3 showing the bare fibers spaced apart on the substrate.
Figure 6:
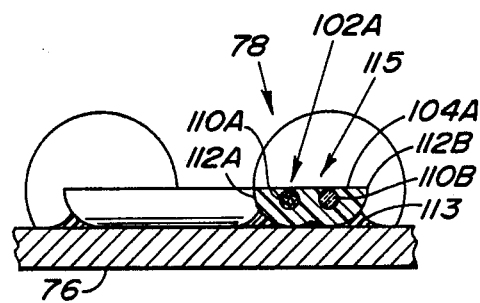
FIG. 6 is a cross sectional view along line 6—6 of FIG. 3 showing the central region of the optical coupler formed between the two lengths of bare fiber.

Referring to FIGS. 3, 5 and 6, the fiber 74 is formed to have a central core 110 and a surrounding cladding 112. The fiber portions 102 and 104 converge together and are joined at the coupler 78 as as shown in FIG. 6 with portions of the polished fibers placed adjacent one another on the substrate 76. The directional coupler 78 is formed between the two fiber sections 102 and 104 by fusing them together. A fused junction 113 between the cladding 112 and the substrate 76 is shown in FIGS. 5 and 6. The fiber sections 102 and 104 are also preferably fused to the substrate 76 in the vicinity of the coupler 78. Energy is applied to the adjacent portions of the fiber to fuse them to each other and to the substrate 76. A preferred method for applying energy to the fiber portions 102 and 104 utilizes a laser (not shown) to apply energy to the fibers to raise their temperatures to the glass transition temperature to fuse the fibers to each other and to the substrate 76.

Still referring to FIG. 6, the juxtaposed portions 102A and 104A form an interaction region 115 where the evanescent field of light propagated by each of the fiber portions 102 and 104 interacts with the other portion. Light is transferred between the fiber portions by evanescent field coupling at the interaction region 115. The fiber portion 102 comprises a central core 110A and a surrounding cladding 112A. The fiber portion 104 has a core 110B and a cladding 112B that are substantially identical to the core 110A and cladding 112A, respectively. The core 110A has a refractive index that is greater than that of the cladding 112A, and the diameter of the core 110A is such that light propagating within it internally reflects at the core-cladding interface. Most of the optical energy guided by the fiber portion 102 is confined to its core 110A. However, solution of the wave equations for the fiber portions 102 and 104 and applying the well-known boundary conditions shows that the energy distribution, although primarily in the core 110, includes a portion that extends into the cladding 112 and decays exponentially as the radius from the center of the fiber increases. The exponentially decaying portion of the energy distribution within the cladding 112 is generally called the evanescent field. If the evanescent field of the optical energy initially propagated by the fiber portion 102 extends a sufficient distance into the fiber portion 104, energy will couple between them.

The coupler 78 includes four ports labeled 78A, 78B, 78C and 78D in FIG. 2. Ports 78A and 78B, which are on the left and right sides, respectively, of the coupler 78 correspond to the fiber portion 102. The ports 78C and 78D similarly correspond to the fiber portion 104. For purposes of explanation, it is assumed that an optical signal input is applied to port 78A through the fiber 102. The signal passes through the coupler 78 and is output at either one or both of ports 78B or 78D depending upon the amount of coupling between the fibers 102 and 104.

The "coupling constant" is defined as the ratio of the coupled power to the total output power. In the above example, the coupling constant is the ratio of the power output at port 78A divided by the sum of the power output at the ports 78B and 78D. This ratio is sometimes called the "coupling efficiency", which is typically expressed as a percent. Therefore, when the term "coupling constant" is used herein, it should be understood that the corresponding coupling efficiency is equal to the coupling constant times 100. The coupler 78 may be tuned to adjust the coupling constant to any desired value between zero and one by controlling the dimensions of the region of overlap of the evanescent fields. Tuning may be accomplished by controlling the separation of the cores 110A and 110B.

The coupler 78 is highly directional, with substantially all of the power applied at one side thereof being output at the ports on the other side. Substantially all of the light applied as an input to either ports 78A or 78C is delivered to ports 78B and 78D without appreciable contradirectional coupling. The directional characteristic is symmetrical in that some light applied to either ports 78B or 78D is delivered to ports 78A and 78C. The coupler 78 is essentially non-discriminatory with respect to polarizations and preserves the polarization of light input thereto.

Light that is cross-coupled from one of the fiber portions 102 and 104 to the other undergoes a phase shift of $\pi/2$, but light that passes straight through the coupler 78 without being cross-coupled is not shifted in phase. For example, if the coupler 78 has a coupling constant of 0.5, and an optical signal is input to port 78A, then the outputs at ports 78B and 78D will be of equal magnitude; but the output at port 78D will be shifted in phase by $\pi/2$ relative to the output at port 78B.

B. Evanescent Field Polarizer

Referring to FIG. 3, the substrate 76 and the unjacketed fiber portions 102 and 104 are polished optically flat to better than one fourth of the wavelength of the optical signal input from the source 72. This polishing forms surfaces 114 and 116 on the fiber portions 102 and 104, respectively. These surfaces 114 and 116 are about one micron or less from the core/cladding boundary in order to access the evanescent fields of the fiber portions 102 and 104. Referring to FIGS. 8–10 and 12, the form birefringent polarizer 75 is deposited on top of the polished fiber section 102.

The interaction between artificial dielectrics and the evanescent field of light guided by an optical fiber to form a polarizer is described in U.S. Pat. No. 4,666,235, issued May 19, 1989 to George A. Pavlath. That application is assigned to Litton Systems, Inc., assignee of the present invention.

Figure 7:
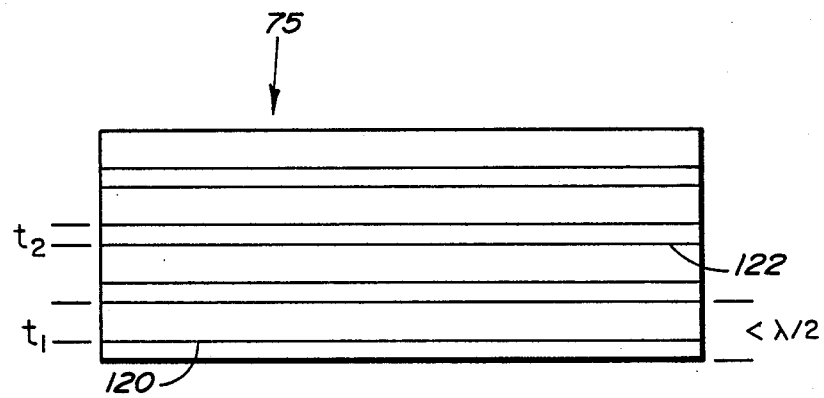
FIG. 7 is an elevation view showing a stack of two alternating dielectric layers.

Referring to FIG. 7, the form birefringent polarizer 75 may be formed of alternating layers 120 and 122 of a pair of dielectric materials having different dielectric constants $n_1$ and $n_2$ and different thicknesses $t_1$ and $t_2$, respectively. The form birefringent polarizer 75 may be regarded as a form birefringent polarizer formed of the dielectric layers 120 and 122. It has been found that making the composite grating structure of alternating layers of the first and second dielectrics produces a device that acts as a homogeneous birefringent material. The combined thickness of two adjacent layers of dielectrics is the period, p, of the form birefringent polarizer. The period is therefore $p = t_1 + t_2$. A grating whose periodicity is smaller than one-half the wavelength of the incident radiation will produce no diffracted orders. The properties of the artificially created birefringent material depend upon the profile, thickness and line-to-space ratio of the form birefringent polarizer. Using state of the art submicrometer fabrication technology, it is possible to produce the form birefringent polarizer to have a periodicity substantially less than one-half the wavelength of coherent light ordinarily used in fiber optic sensor applications.

It is convenient to express the thickness of the first dielectric layer as a fraction q of the period p so that the thickness of the first dielectric layer 120 is qp. In a typical application, the periodicity, p, is 1,000 Å; and the thickness qp of the second dielectric 122 is 100 Å. The first dielectric layer 120 may be conveniently formed of silicon-dioxide glass, and the second dielectric layer may be titanium-dioxide glass. The refractive indices of the layers 120 and 122 should differ from that of the cladding 112.

Rigorous calculation of the electromagnetic properties of form birefringent polarizers in the optical region of the electromagnetic spectrum is difficult. The problem is greatly simplified by assuming that the grating period is much smaller than the optical wavelength. In the strictest sense, requiring the period to be much less than the wavelength is difficult to meet in some regions of the spectrum, particularly the visible region and regions having wavelengths shorter than the wavelengths of the visible spectrum. However, if the grating period is less than half the optical wavelength in the fiber 74, there will be no diffracted orders; and the form birefringent polarizer will act as an anisotropic medium, although actual measured values of the refractive indices may not agree precisely with the results of the simplified analysis.

For purposes of analysis, the form birefringent polarizer 75 can be treated as a periodic stratified medium sandwiched between two homogeneous dielectrics, one being the fiber cladding, the other being air. It is possible to calculate the optical properties of periodic stratified media using the theory of electromagnetic Block waves. The problem basically involves matching the electromagnetic boundary conditions at each interface. It is well known from Maxwell's equations that components of the electromagnetic field vector parallel to the layers must be continuous and that the components of the electric field vectors perpendicular to the interfaces are discontinuous and related to the refractive indices of the materials according to $$n_1^2 E_1 = n_2^2 E_2 \tag{2}$$

where $E_1$ and $E_2$ are the perpendicular components of the electric field on the two sides of a dielectric interface and $n_1$ and $n_2$ are the refractive indices of the two dielectrics.

The thickness of the cladding 112 adjacent the form birefringent polarizer 75 must cause the evanescent field of light propagating in the fiber 74 to interact with the birefringent form birefringent polarizer to couple light of an undesired polarization out of the fiber 74 into the form birefringent polarizer while light of a desired polarization remains in the fiber 74. For the structure described, light polarized perpendicular to the form birefringent polarizer couples from the fiber while light polarized parallel to the form birefringent polarizer remains in the fiber 74.

Since the direction of propagation of the wave in the fiber 74 at the interaction region is essentially parallel to the layers of the first and second dielectrics, it is possible to treat the boundary value problem as an array of periodic dielectric wave guides. Both analyses of the problem give the same result if the period is much less than the wavelength for propagation parallel to the layers. The result is that for the effective refractive indices $n_\parallel$ for electric fields parallel to the layers and $n_\perp$ for electric fields perpendicular to the layers:

$$n_\parallel \cong [n_1^2 q + n_2^2 (1-q)]^{\frac{1}{2}} \tag{3}$$

$$n_\perp \cong [(1/n_1)^2 q + (1/n_2)^2 (1-q)]^{-\frac{1}{2}} \tag{4}$$

Optical waves with electric fields polarized parallel to and perpendicular to the layers of the stack see different refractive indices. The form birefringent polarizer 75 is said to be form birefringent since the effective dielectric constant is one value for all polarizations parallel to the layers 120 and 122 and another value for polarizations normal to the layers.

C. Cutoff Polarizers

Figure 35:
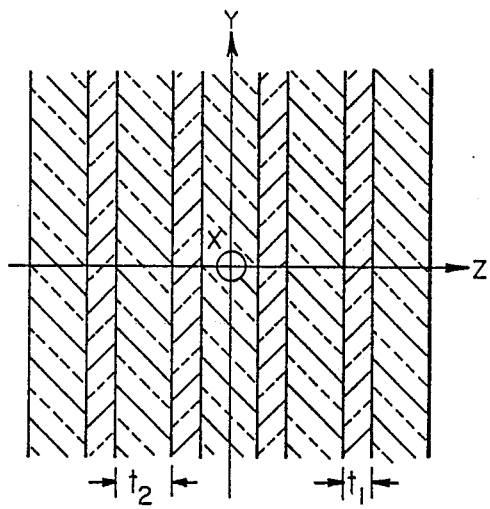
FIG. 35 illustrates a form birefringent cutoff polarizer that may be included in the fiber optic gyroscope of FIG. 12.
Figure 36:
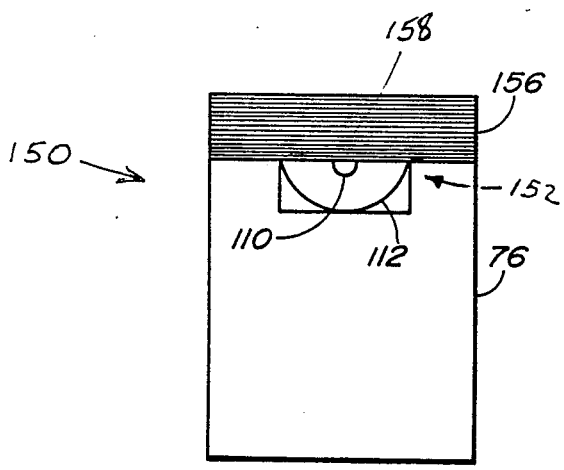
FIG. 36 is a cross sectional view of the form birefringent cutoff polarizer of FIG. 35.

Referring to FIGS. 35 and 36, a cutoff polarizer 150 suitable for use in the fiber optic gyroscope 70 may be formed by polishing into the core 110 to access the field of light inside the core 110. The cutoff polarizer 150 includes a portion 152 of the optical fiber 74 that is mounted to the substrate 76. A form birefringent stack 156 similar to the form birefringent polarizer 75 is positioned adjacent a generally planar interaction region 158 in the portion 152 of optical fiber 74.

Optical fiber 74 is a birefringent medium, which means that the refractive index is polarization dependent. The amount of birefringence is used herein to mean the difference between the two refractive indices of a medium that guides a light wave. Since fiber 74 is birefringent, the two polarization components will be shifted in phase as they propagate along the fiber. The velocity of light in an optical fiber is $v = c/n$, where c is the free space velocity of light and n is the refractive index of the fiber. The polarization component for which the fiber 74 has the lower refractive index will have a greater velocity and, therefore, a smaller transit time in the fiber 74 than the other polarization component.

If fiber 74 is designed to propagate only a single mode of optical energy, its core 110 normally has a circular cross section that is about 5 mm in diameter. Cladding 112 normally provides a refractive index distribution that is symmetrically disposed about core 110. If the refractive index of cladding 112 is symmetrical with respect to core 110, then almost all of the optical energy guided by fiber 74 is confined to core 110 if the core index is greater than the cladding index. However, if the fiber portion 152 has an asymmetric refractive index distribution, core 110 has a cutoff diameter. If the core diameter is less than the cutoff diameter, then the optical energy cannot be confined exclusively to core 110. The cutoff polarizer 150 uses this cutoff property to remove polarizations parallel to the interaction region 158 from fiber 74.

If an optical signal of mixed polarization in the fiber is incident upon polarizer 150, the asymmetry in refractive index at the interaction region 158 causes polarization components parallel to the interaction region 158 to radiate from the fiber. According to the usual convention, the direction of propagation is the z-axis, which is into the plane of FIGS. 35 and 36. Assuming a right-hand coordinate system, the x-axis lies in the plane of FIGS. 35 and 36 and points to right. The y-axis lies in the plane of FIGS. 35 and 36 and is perpendicular to both the x- and z-axes. Since the refractive index of form birefringent stack 156 is essentially equal to that of the cladding for the polarization perpendicular to the interaction region, this polarization remains guided by the core by means of internal reflection. The polarization component perpendicular to the surface experiences a decrease in core cross sectional area, which increases the evanescent field portion of the guided wave.

It is also possible to form the cutoff polarizer 150 shown in FIG. 36 by replacing the stack 156 with a thin metal layer (not shown). A dielectric layer (not shown) may be placed between the core 110 and the metal layer. The core dimension has been reduced sufficiently to cut off propagation of both the desired and undesired polarizations in the fiber 102. The undesired polarization travels through the metal film and is thus removed from the fiber 102. The desired polarization produces a surface plasmon wave in the metal film. This plasmon wave guides the energy associated with the desired polarization around the interaction region 158. When the fiber core is large enough to guide light, the plasmon wave couples back into the fiber as light of the desired polarization.

Depending on whether the polished surface in FIG. 12 is near or into the core and what the refractive indices and the fractional thicknesses of the dielectric layer are, the following situations are realizable:

1. Both polarizations (i.e. parallel and perpendicular to the layers of the stack) propagate through the fiber but at different velocities, which results in birefringence.

2. One of the polarizations propagates while the other is cutoff, or severely attenuated. The velocities of the two polarizations are again different, which results in birefringence. This case results in a single polarization loop coupler-polarizer module.

3. Both polarizations are cutoff (attenuated), and their velocities are different. This case can be used to attenuate optical energy without reflection. This can be useful on the dead end of the first and second directional couplers in a fiber gyroscope.

D. Phase Modulators

The phase modulator 88 permits the addition of detectable phase shifts onto an electromagnetic carrier signal. The phase shifts can be decoded at a receiver (not shown) connected to the detector 96 and the detected information extracted therefrom.

Figure 13:
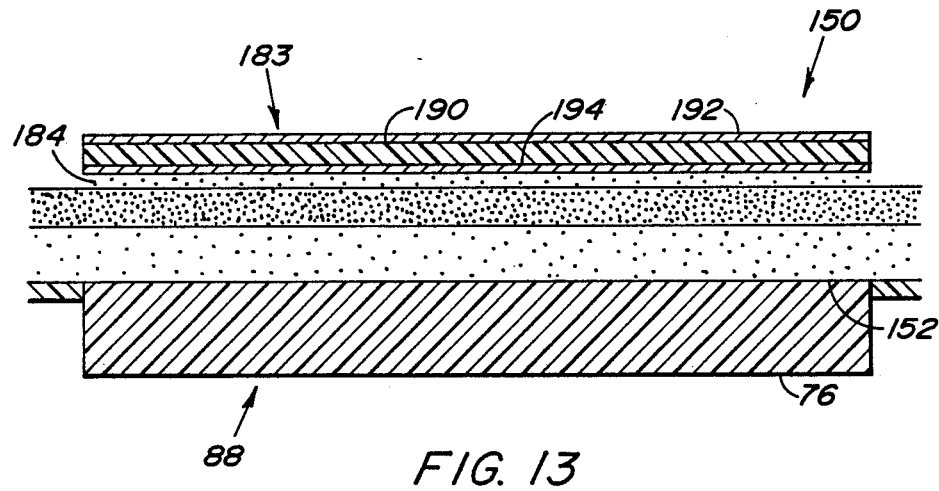
FIG. 13 is a cross sectional view of a phase modulator that may be included in the system of FIG. 12.
Figure 14:
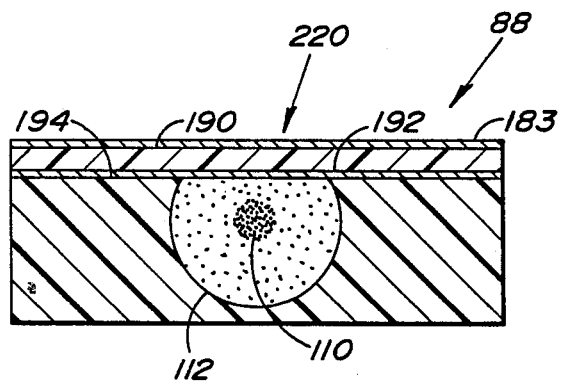
FIG. 14 is a cross sectional view of the phase modulator of FIG. 13.

Referring to FIGS. 13 and 14, the modulator 88 generally includes a substantially planar transducer 183 fixed to the substrate 76 and the fiber 102 by means of a layer 184 of epoxy resin or other appropriate adhesive.

The transducer 183 is preferably formed of a layer of piezoelectric material 190 sandwiched between an upper electrode 192 and a lower electrode 194 of appropriate conductive material such as aluminum. A preferred piezoelectric material for use in the modulator 88 is lithium niobate.

The piezoelectric layer 190 generates an acoustic wave that propagates in a direction orthogonal to the planar surface of the transducer 183 upon application of a voltage of alternating polarity across the electrodes 192 and 194. The material of the layer 190 may be poled for vibration either orthogonal to or collinear with the fiber 74 to generate longitudinal or shear modes of acoustic wave energy.

Vibration of the layer 190 generates an acoustic wave that propagates in a direction perpendicular to the optical axis of the fiber 74 As is well known, the wavelength of the center frequency of this bulk acoustic wave is equal to one-half the thickness of the layer piezoelectric 190. The electrodes 192 and 194 may be formed to thicknesses appropriate to the practice of this invention by a vacuum deposition or like thin film technique.

As light passes through the portion of the fiber 74 within the block 182, and particularly that portion adjacent the interaction region 220, the light interacts with the bulk acoustic wave that is launched by vibration of the piezoelectric transducer 183 in response to the voltage of varying polarity applied to the electrodes 192 and 194 at either side of the piezoelectric layer 190.

The size and materials of the lower electrode 194, adhesive layer 184 and the piezoelectric layer 190 are selected so that their combined acoustic impedance matches the acoustic impedance of the portion of the fiber portion 102 opposite the transducer 183. Matching the acoustic impedances assures that maximum acoustic energy is transmitted to the core 110 of the fiber 102 in response to the energy applied to the phase modulation system 88. In a preferred embodiment of the phase modulator 88 the layer of piezoelectric material 190 comprises crystalline lithium niobate ($LiNbO_3$), with a thickness on the order of 100 μ and aluminum electrodes having thicknesses on the order of 2000 Å.

Thus, the acoustic impedance of the layer 190 may predominate the design of the device, and the relative dimensions of FIGS. 13 and 14 are accordingly somewhat distorted for clarity of illustration. The interaction of the propagating acoustic wave with the optical energy guided by the fiber portion 102 causes a predictable resultant phase shift in the transmitted optical energy. This phase shift results from the well known acousto-optic effect that rearranges the dipole moments within the material of the fiber core 110. The magnitude of this phase shift is primarily a function of the power applied to the system by means of the source 72 and the length of the fiber 102 adjacent the transducer 183.

The acoustic wave launched by the transducer 183 effects a predetermined change, $\Delta n$, in the refractive index of the fiber medium. This change in the refractive index is a direct function of the amplitude of an acoustic strain wave generated within the fiber. The acoustic wave power, P, is a function of the system power input by source 72. Since there is a small amount of insertion loss the acoustic wave power is somewhat less than the power input. The insertion loss represents the energy conversion efficiency of this portion of the process.

The controlled vibration of the piezoelectric transducer 183 adjacent the optical fiber 102 serves to launch an appropriate acoustic wave into the fiber. The phase modulator 88 thus produces a phase shift in light guided by the fiber 102 by an acousto-optical process.

E. Frequency Shifters

Figure 15:
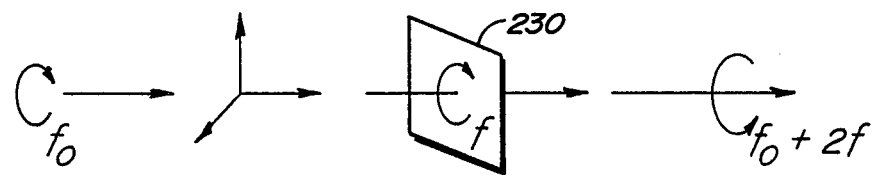
FIG. 15 schematically represents a rotating half-wave plate with light inputs and outputs.

FIG. 15 represents circularly polarized input light being incident upon a half-wave plate 230 that is rotating at an angular velocity f. The input wave is shown to have a frequency $f_o$. The wave is traveling in the positive z-direction and has polarization vectors along the x- and y-axes that are of equal magnitude and 90° out of phase. Therefore, the polarization vector appears to rotate at angular velocity $f_o$ about the z-axis in a clockwise direction when viewed looking toward the direction of propagation. The half-wave plate 230 rotates in the same direction as the polarization vector so that the output wave is frequency shifted from the input frequency $f_o$ to have a frequency of $f_o+2f$.

Figure 16:
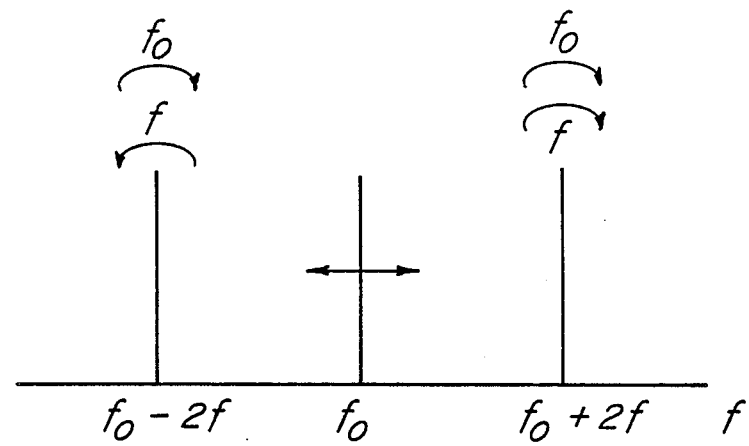
FIG. 16 graphically illustrates the effect of the frequency shifter of FIG. 15 on an optical signal.

FIG. 16 graphically represents the possible frequency outputs from the frequency shifter 91 when it is operated as a single-side-band-suppressed-carrier phase shifter. If the input frequency is $f_o$, then rotating the half-wave plate at frequency f in the direction of polarization of the input beam produces an output of $f_o+2f$. Rotating the half-wave plate 230 at the frequency f opposite in direction to the polarization of the circularly polarized input wave produces an output frequency of $f_o-2f$. Controlling the rotational frequency f permits the output frequency of the quarter-wave plate to have a range of $f_o \pm 2f_{max}$ where $f_{max}$ is the maximum rotational frequency of the half-wave plate 230.

The amplitude of the outputs of the frequency shifter 91 is $$\phi(t) = A \exp[i(f_o+2f)t] + B \exp[if_o t]. \tag{5}$$

The intensity of the output wave is the square of the amplitude and is given by $$I = |\phi(t)|^2 \tag{6}$$

-continued
$$= A^2 + B^2 + 2AB\cos(2ft). \tag{7}$$

The coefficient A is ordinarily much larger than B so that $B^2$ is negligible.

Figure 18:
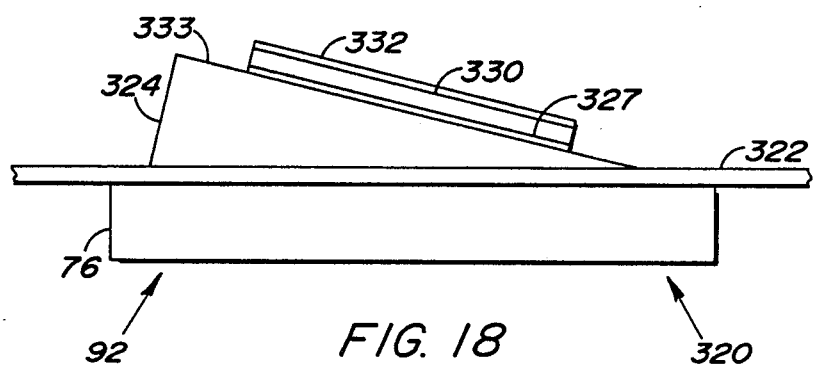
FIG. 18 illustrates a frequency shifter that may be included in the fiber optic gyroscope system of FIG. 12.

A frequency shifter structure that may be used in the fiber optic gyroscope 70 is shown in FIG. 18. The frequency shifter 92 may include a length 322 of the optical fiber 74 retained between a block 324 formed of a material such as fused quartz and the substrate 76. A transducer 330 formed of a PZT plate mounted between two metallic Cr-Au layers 327 and 332, for example, is mounted to the block 324. The transducer 330 may be driven by a suitable oscillator (not shown) to launch an acoustic wave at an angle $\theta$ in the fiber.

Figure 17:
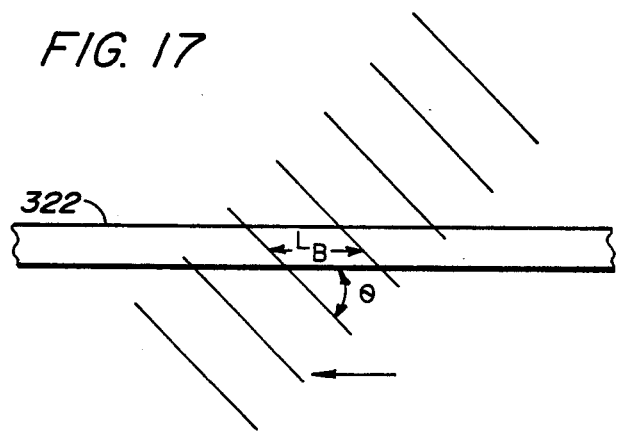
FIG. 17 illustrates an acoustic wavefront impinging upon an optical fiber.

The fiber 74, being a single mode fiber, supports two orthogonal polarizations of the single propagation mode. There are two polarizations because the fiber is birefringent, having different refractive indices for different directions of the electric field in the fiber. The two polarizations are normally uncoupled so that there is no energy transfer from one polarization to the other. A spatially periodic stress pattern imposed on the fiber induces coupling between the two polarizations, leading to power transfer therebetween. It has been found that the power transfer is cumulative only if the spatial period of the stress pattern equals the beat length of the fiber. Referring to FIG. 17, the beat length of the optical fiber is $L_B = \lambda/\Delta n$, where $\Delta n$ is the difference in the refractive indices for the two polarizations and $\lambda$ is the optical wavelength. It has been found that a stress pattern is most effective in causing coupling of the two polarizations when the stress is directed at 45 degrees to the principal axes of birefringence.

The transducer 330 forms a moving stress pattern in the fiber portion 322 by means of the traveling acoustic wave. If the stress pattern moves along the fiber, light coupled from one polarization to the other is shifted in frequency by an amount equal to the frequency of the moving stress pattern because of the motion of the coupling region. For convenience of reference, one of the polarizations will be referred to as "slow;" and the other polarization will be referred to as "fast." The velocity of a light wave in a dielectric medium is the free space velocity of light divided by the refractive index of dielectric, or $v = c/n$. Therefore, it may be seen that in a birefringent medium the polarization for which the refractive index is the greater is the slow wave; and polarization for which the refractive index is smaller is the fast wave.

Referring to FIG. 17, a plane acoustic wavefront of wavelength $\lambda_a$ incident upon the fiber portion 322. Phase matching occurs when the component of the beat length $L_B$ in the direction of propagation of the acoustic wave equals the acoustic wavelength. Therefore, from FIG. 17 it is seen that $L_B \sin \theta = \lambda_a$. Using a well-known relation between wave velocity, frequency and wavelength to eliminate the acoustic wavelength from the preceding equation gives the acoustic frequency as $f = v/(L_B \sin \theta)$, where v is the acoustic wave velocity in the fiber.

Figure 20:
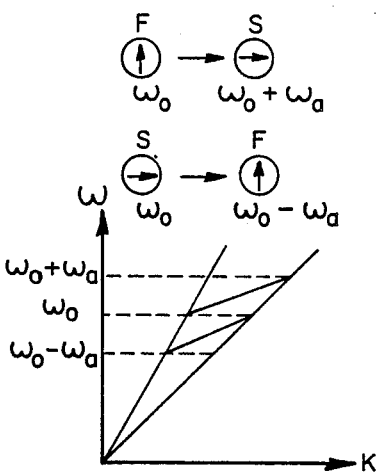
FIGS. 20 and 21 graphically illustrate the effects of the frequency shifter of FIG. 19 on an optical signal.

The specific nature of the interaction between the acoustic wave and the two optical polarizations propagated by the fiber can be demonstrated using frequency-wave number diagrams. Referring to FIG. 20, if the acoustic wave travels in the same direction as the light in the fiber 74, light polarized in the fast mode and having frequency ω couples to the slow mode with the resulting wave having a frequency $\omega + \omega_a$, where $\omega_a$ is the acoustic wave frequency. Light propagating in the slow mode couples to the fast mode and shifts in frequency to $\omega - \omega_a$.

Figure 21:
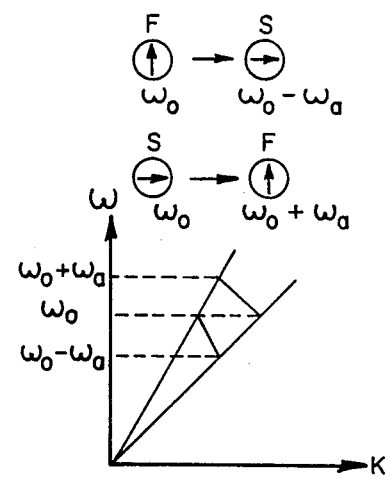

As shown in FIG. 21, if the acoustic wave propagates in a direction opposite to that of the light in the fiber 74, the frequency shifting characteristics of the system reverse. Specifically, light propagating in the fast mode couples to the slow mode with a change in frequency to $\omega - \omega_a$; and light propagating in the slow mode couples to the fast mode with a change in frequency to $\omega + \omega_a$.

Therefore, the frequency shifter 320 is a single side band frequency shifter is only light of a single polarization impinges upon the portion of the fiber 74 having the periodic moving stress pattern therein. In practice, the selected polarization may have small amounts of the carrier frequency and the sideband having the opposite frequency shift because of the finite extinction ratio of the polarizers included in the gyroscope and other factors.

Figure 19:
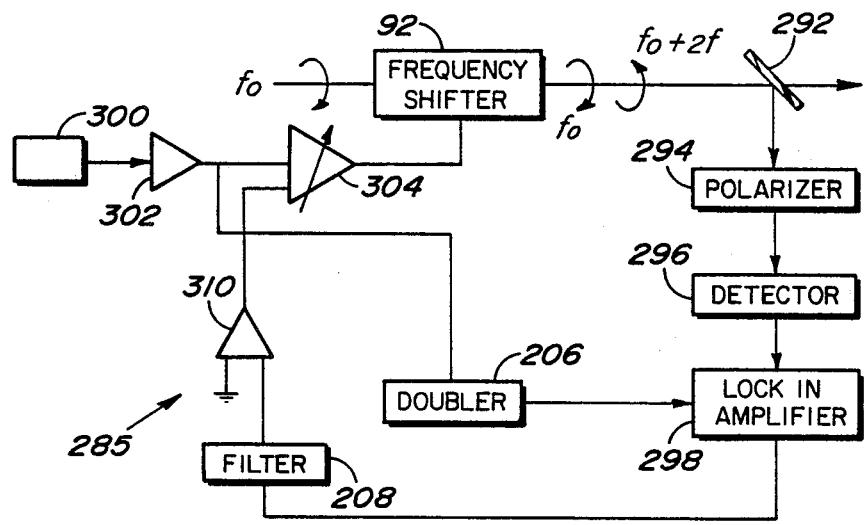
FIG. 19 is a circuit diagram of a circuit for controlling a frequency shifter that may be included in the fiber optic gyroscope system of FIG. 12.

FIG. 19 illustrates a feedback system 285 for controlling the output frequency of the frequency shifter 92 to minimize the undesired carrier frequency component. The frequency shifter 92 has incident thereon a light wave of frequency of $f_o$ from the light source 72. The incident wave has a clockwise circular polarization as seen looking from the light source 90 toward the frequency shifter 92. The amplitude output from the frequency shifter 92 is given by Equation (5). The term B exp[i($f_o$t)] represents an undesired portion of the carrier input signal that has propagated through the frequency shifter 92. The output beam of the frequency shifter 92 is incident upon a beam splitter 292, which may, for example, transmit approximately 10% of the incident light upon a polarizer 294.

The unwanted portion of the output intensity has the same polarization as the input wave while the desired portion of the output intensity has the opposite polarization. The polarizer 294 transmits only a portion of each wave. The output of the polarizer 294 is incident upon a photodetector 296, which outputs an error signal indicative of the third term of Equation (7).

The error signal is input to a lock-in amplifier 298. A voltage source 300 supplies a voltage V to a voltage-controlled-oscillator 302, which produces an oscillatory voltage having a frequency f that is a function of V. The output of the voltage-controlled-oscillator 302 is amplified by a variable gain amplifier 304 to provide a control signal to the frequency shifter 92 and to a doubler 206. The doubler 206 provides an output signal having a frequency of 2f to the lock-in amplifier, thereby causing the lock-in amplifier 298 to amplify only signals having frequency 2f, which is the frequency of the third term of Equation (7). The output of the lock-in amplifier 298 is a voltage proportional to 2AB, the coefficients of the third term, 2AB cos (2ft) of Equation (7). The output of the lock-in amplifier 298 passes through a filter 208 to a comparator 310 that has one grounded input. Therefore, if the voltage proportional to 2AB that is input to the comparator 310 is not zero, then the comparator 310 produces an output voltage that is input to the gain control of the variable gain amplifier 304 as a negative feedback signal to either increase or decrease the voltage of the control signal input to the frequency shifter 92. The negative feedback signal causes a reduction in the coefficient B, which reduces the error signal and causes the output of the frequency shifter 92 to have the desired frequency.

F. Source Wavelength Stabilization

Stabilization of the scale factor is critical to the performance of a high accuracy fiber optic gyroscope. The scale factor, which relates the angular rotation rate of the sensor to the Sagnac phase shift, is sensitive to changes in the length of the fiber and to variations on the operation wavelength of the source. In superluminescent diodes (SLDs), variations in the emission wavelength are caused by thermal fluctuations in the active region caused by changes in the ambient temperature and in the drive current. Typically, the temperature dependence of the SLD emission wavelength is about 0.2 nanometers per °C. To obtain the required wavelength stability by thermal means alone would require the temperature of the SLD to be held constant to a few millidegrees. The need for such stringent temperature stability can be obviated by using a reference interferometer to continuously monitor the emission spectrum of the SLD. In this scheme, changes in the emission spectrum generate an error signal which is processed and fed back to the diode to hold the wavelength constant.

Lasers, with their long coherence length, are readily stabilized by using a temperature stabilized scanning Fabry-Perot interferometer to lock the cavity length. However, the large spectral bandwidth of the SLD precludes the use of optical spectrum analyzers to monitor the emission wavelength of the diode. To analyze the typical 10 nm emission bandwidth of an SLD the mirrors of a Fabry-Perot interferometer would have to be spaced approximately 1 μm apart, which is impractical.

A practical wavelength scheme must take into account the volume budget of the gyro the capability of packaging it within the gyro housing. These constraints limit the volume of the wavelength stabilization device to a few cubic centimeters maximum.

Optical sensing systems may use semiconductor diode lasers or superluminescent diodes as light sources. A wideband source such as the superluminescent diode (SLD) 72 or a narrower source (not shown) such as a single or multimode laser diode needs frequency stabilization in order to be suitable as an optical source for a Sagnac ring fiber optics rotation sensor.

There are at least three groups of laser diodes that are classified according to structure. Simple diode lasers are called homostructure lasers because they are made of a single semiconductor material. A homostructure laser diode may comprise, for example, regions of n-type and p-type gallium arsenide. The combination of electrons injected from the n-region into the p-region with holes, or positive charge carriers, in the p-region causes the emission of laser light. All laser diodes include two polished parallel faces that are perpendicular to the plane of the junction of the p-type and n-type regions. The emitted light reflects back and forth across the region between the polished surfaces and is consequently amplified on each pass through the junction.

A typical single heterostructure semiconductor laser includes an additional layer of aluminum gallium arsenide, in which some of the gallium atoms in the gallium arsenide has been replaced by aluminum atoms. Injected electrons are stopped at the aluminum gallium arsenide layer, which causes the emission of a higher intensity laser light than ordinarily occurs with a homostructure diode laser.

A typical double heterostructure semiconductor laser includes three layers of gallium arsenide separated by two layers of aluminum gallium arsenide. Preselection of either n-type or p-type materials cause further increases of the intensity of the emitted laser beam.

Figure 22:
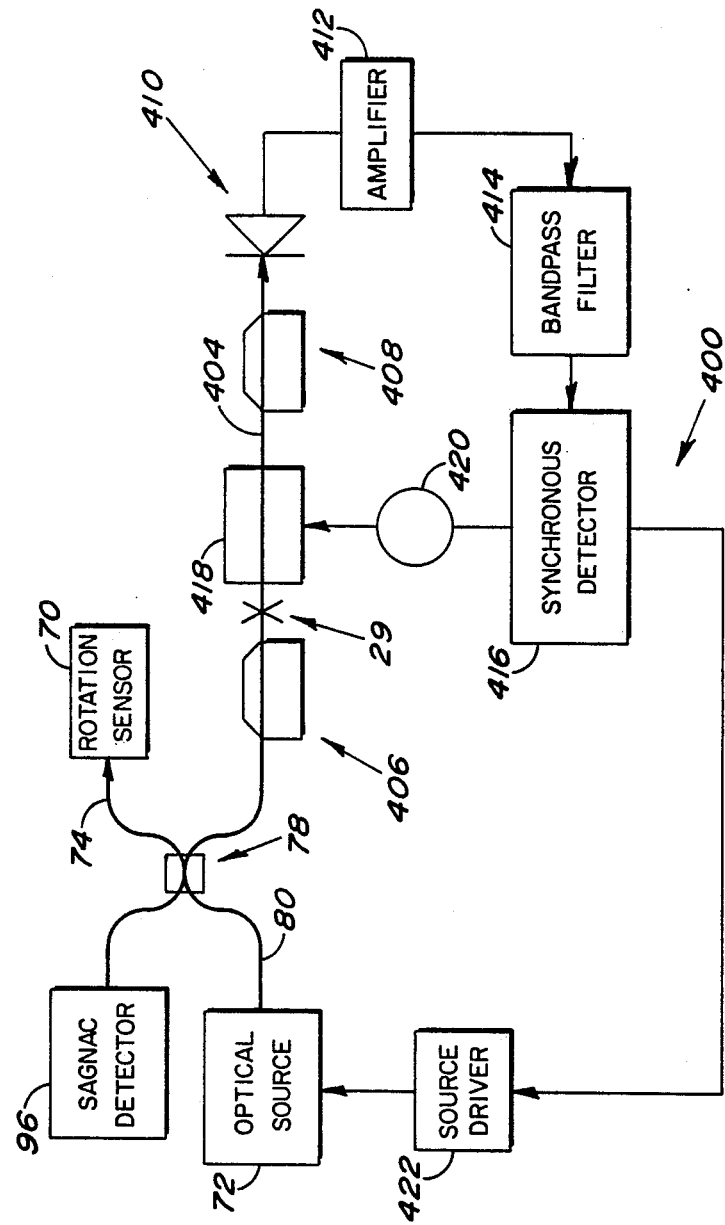
FIG. 22 schematically illustrates a frequency control device for stabilizing an optical signal source included in the system of FIG. 12.

Referring to FIG. 22, an optical source controller system 400 for controlling the wavelength output from the optical signal source 72 includes an optical coupler 78, a length of a fiber polarization maintaining fiber 404, a polarizer 406, an analyzer 408, a photodetector 410, an amplifier 412, a band pass filter 414, a synchronous detector 416, a phase modulator 418, a driver oscillator 420 and a source driver 422.

Part of the light from the optical source 72 cross couples into the fiber 80. This light then passes through the polarizer 406, which transmits a beam that is linearly polarized at an angle of 45° to the principal axes of the fiber 404. The fiber 404 is a polarization maintaining fiber that may be formed by a variety of techniques described subsequently. The polarization maintaining fiber 404 has refractive indices that differ significantly for different polarizations. Since the light input to the fiber 404 has polarization components along both of the fiber axes, both of these polarizations will propagate in the fiber 404 without mixing together.

Since the velocity of light in the fiber 404 is $v = c/n$, where c is the speed of light in a vacuum and n is the refractive index of the fiber for the particular polarization under consideration, the two polarizations have different velocities in the fiber. The slow wave has velocity $v_s = c/n_1$, and the fast wave has velocity $v_f = c/n_2$, where $n_2 < n_1$. The fiber 404 converts the linearly polarized light input into an elliptically polarized wave due to superposition of the orthogonal fast and slow waves.

Figure 23:
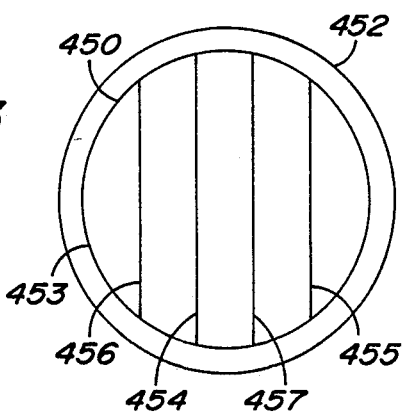
FIG. 23 is a cross sectional view of polarization maintaining fiber that may be included in the frequency control device of FIG. 22.

One type of polarization maintaining fiber has a layered core 450 and a surrounding cladding 452 as shown in FIG. 23. The core 450 has different refractive indices for waves of different polarizations so that the propagation constants of the core are polarization-dependent. The cladding 452 has a refractive index that is less than both of the core refractive indices. Light incident upon an interface between two dissimilar dielectrics from the material having the greater refractive index will be internally reflected if the angle of incidence is less than a critical angle. Therefore, the polarization maintaining fiber guides light of both polarizations. Since the propagation constants of the core are different, or non-degenerate, for the two polarizations, energy does not readily couple between them. Therefore, light propagated by the polarization maintaining fiber 80 experiences no change in polarization.

A core having birefringent properties can be synthesized by properly choosing materials for the layers to have particular refractive indices and thicknesses. Referring to FIG. 23, the core 450 is comprised of layers 453–455 of a first material and layers 456 and 457 of a second material having an index of refraction different from the first material. The core 450 may comprise many layers of the two materials, but only the five layers 453–457 are shown for convenience of illustration and explanation.

The core 450 is shown to be circular in cross section, as in most optical fibers. The materials comprising the core 450 and cladding 452 are chosen such that the core indices of refraction for polarization along the z-axis and the y-axis are greater than the index of the cladding 452. Therefore, a wave polarized along the z-direction input to the form birefringent fiber 80 will remain polarized in the z-direction.

Unlike ordinary optical fibers, the form birefringent single mode fiber 404 will maintain the polarization state of a wave propagating therein. In the fiber 404 the difference between the refractive indices for the two polarizations is sufficiently large that there is a substantial difference between the propagation constants of waves having the two orthogonal polarizations. The difference between the propagation constants eliminates the degeneracy between the polarization states and prevents waves of one polarization from coupling to the other polarization under ordinary conditions. Coupling of energy between waves requires that the waves have essentially the same velocity. If the velocities are different, there is no appreciable coupling between the two states.

Figure 24:
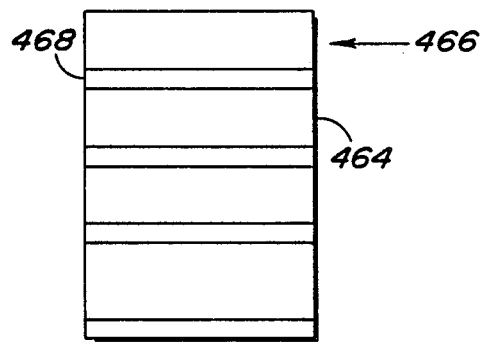
FIG. 24 is an elevation view of a stack of alternating layers of dielectrics that may be used to form the polarization maintaining fiber of FIG. 23.
Figure 32:
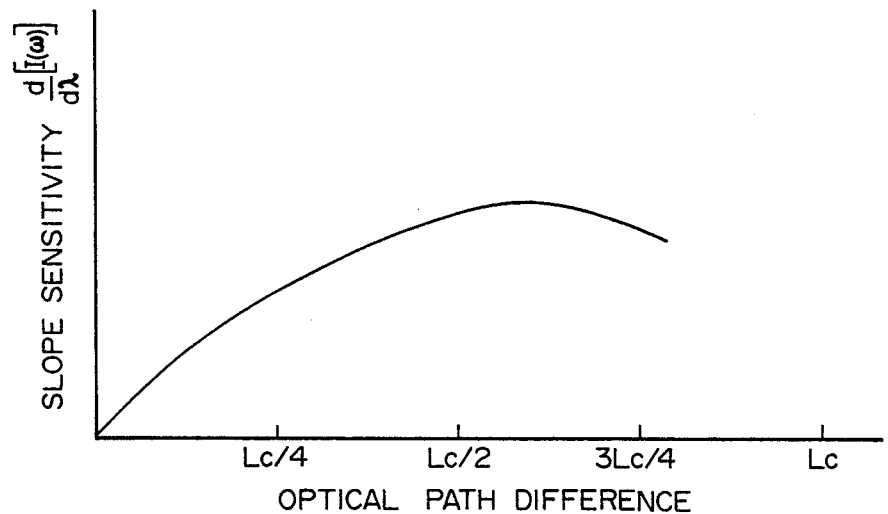
FIG. 32 graphically represents the slope sensitivity of the output of a reference interferometer that may be included in the optical source stabilization system of the invention as a function of the optical path difference in the reference interferometer.

Referring to FIG. 24, the polarization maintaining fiber 404 as shown in FIG. 23 may be formed from a stack 466 of alternating layers of materials 468 and 469 having different refractive indices. The stack 466 is heated to form an essentially monolithic block. The block may then be drawn through a succession of dies, or otherwise stretched by methods well-known in the art, to reduce its dimensions to values suitable for use as the core 450. Before drawing, the block may be ground to form a cylinder in order to produce a core having a circular cross section. A cladding having a refractive index less than both refractive indices of the core 450 may be added thereto by any of several standard techniques, such as fusing bulk silicon dioxide, $SiO_2$, onto the core, collapsing $SiO_2$ tubing onto the core, or by refractive deposition of $SiO_2$ from a gaseous mixture.

$GeO_2$ may be used as the high index component and $SiO_2$ as the low index component in the stack 466. Both silica and germania are used in virtually all single mode and multimode fibers because of their low loss and physical compatibility. Combined inhomogeneously with proper fractional thickness they form the core 450 with both $n_z$ and $n_y$ being large enough to be clad by fused silica.

Well established optical fabrication techniques can be used to fabricate the $SiO_2$ plates from pure bulk $SiO_2$. However, the $GeO_2$ component may be too thin to be formed by mechanical fabrication techniques. The $GeO_2$ layer may be formed by sputtering a $GeO_2$ film onto an $SiO_2$ substrate or by coating the $SiO_2$ with a layer of Ge and oxidizing it to $GeO_2$ in a tube furnace.

Other types of high birefringence fiber suitable for use as the polarization maintaining fiber 404 are disclosed in the following U.S. Patents:

U.S. Pat. No. 4,549,781 issued Oct. 29, 1985 to Bhagavatula et al. for "Polarization-Retaining Single-Mode Optical Waveguide";

U.S. Pat. No. 4,529,426 issued July 16, 1985 to Pleibel et al. for "Method of Fabricating High Birefringence Fibers";

U.S. Pat. No. 4,465,336, issued Aug. 14, 1984 to Huber et al. for "Wavelength and Method of Manufacturing Same"; and U.S. Pat. No. 4,561,871 issued Dec. 31, 1985 to Berkey for "Method of Making Polarization Preserving Optical Fiber".

If the reference signal that drives the piezoelectric transducers is sinusoidal with a modulation frequency $\omega_p$, then the time delay $\tau$ between the fast and slow waves may be written as $$\tau = \tau_0 + \Delta\tau \cos \omega_p t. \qquad (8)$$

If $\omega\tau = 2\pi m$, where m is an integer, then the time delay is a maximum or a minimum. An excursion in the time delay changes the output intensity. Referring to FIG. 22, after traveling through the fiber 80, the light is incident upon the analyzer 408. The optical signal input to the analyzer 408 may be written as $I \cong 1 + \cos \omega\tau$), where $\omega$ is the optical frequency and $\tau$ is the time delay between the fast and slow polarizations over the length of the fiber 80. The phase modulator 418 produces modulation in the relative phase of the fast and slow waves. The driver oscillator 420 acts as an alternating current source having a frequency $\omega_p$ and drives the phase modulator 418.

When the phase modulator 418 is operating, the electrical current output from the sagnac detector 96 may be written as $$i \sim (1 + \cos[\omega\tau + \phi_p \cos \omega t]). \qquad (9)$$

This output current is then sent through the bandpass filter 414, which passes the squeezer frequency $\omega_p$. The signal output from the bandpass filter is then input to a synchronous detector 416, or lock-in amplifier, which receives a reference signal from the squeezer driver. After demodulation, the signal is $$S_1 \approx \sin \omega\tau J_1(\phi_p). \qquad (10)$$

where $J_1$ is the first order Bessel function. This signal is used to servo the source frequency to force toward zero.

Figure 25A:
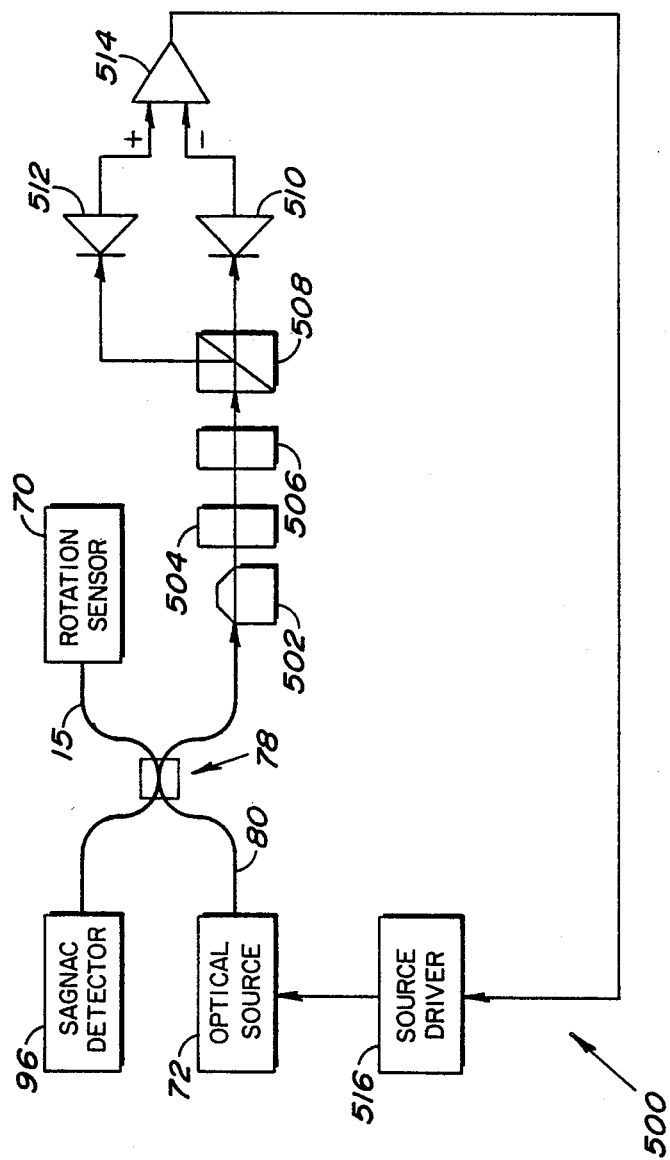
FIG. 25A and 25B schematically illustrate devices that may be used for stabilizing an optical signal source included in the system of FIG. 12.
Figure 25B:
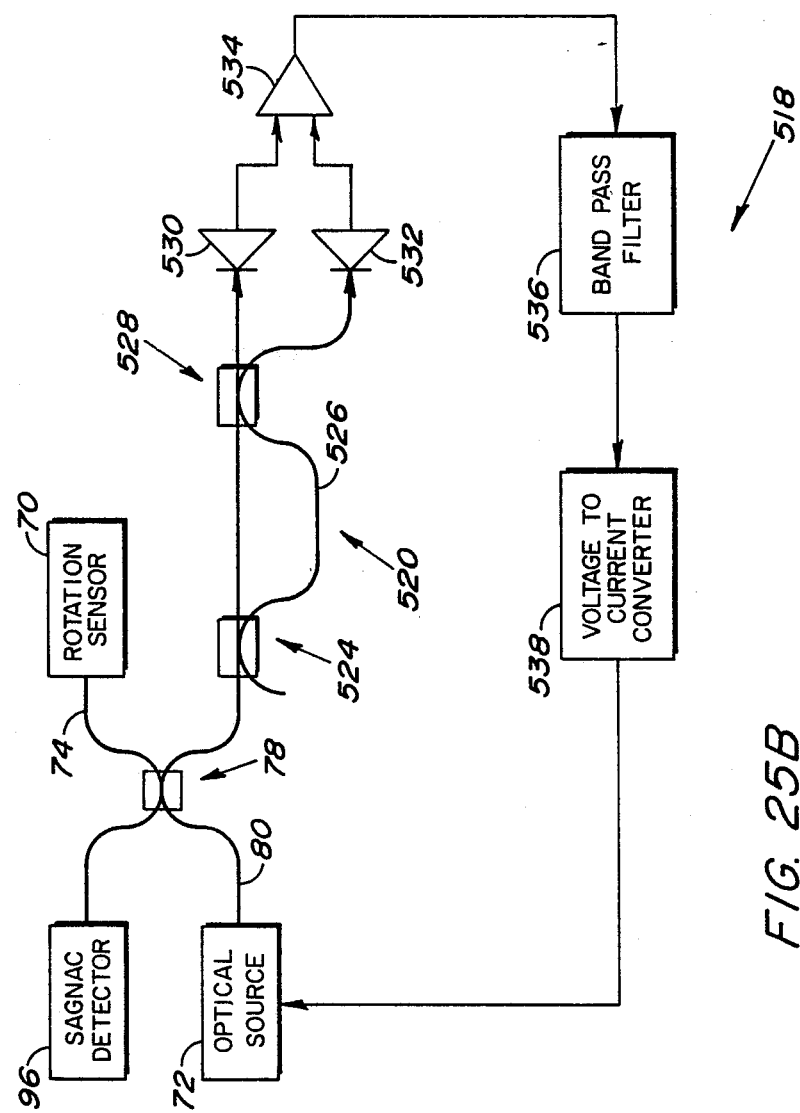

FIGS. 25A and 25B illustrate another type of system 500 for stabilizing the wavelength of the source 72. Referring to FIG. 25, light from the source 72 is coupled into the fiber 80 and then passed through a polarizer 502. The polarizer 502 may be any type of polarizing device, but is preferably formed similarly to the reciprocity polarizer 86 of FIG. 12. The axis of the polarizer 502 is aligned to be at a 45° angle with the polarization of the light input thereto. The light then propagates through a first birefringent crystal 504 that has a 50/50 split in energy along the fast and slow waves therein. The light then passes through a second birefringent crystal 506 that also has a 50/50 split in energy along the fast and slow waves. In general, the output of the crystal 506 is an elliptically polarized light beam. The output of the crystal 506 is then input to a polarization beam splitter 508, which has output intensities of $I_0(1+\cos \phi)$ and $I_0(1-\cos \phi)$, where $\phi$ is birefringent phase shift generated by the crystals 504 and 506. At the correct source frequency, the intensities output by the polarizing beam splitter 508 are equal such that $$I_0(1+\cos \phi) = I_0(1-\cos \phi). \qquad (11)$$

The two beams output from the polarizing beam splitter 508 are made to be equal by servoing the drive current of the source 72 with a signal indicative of the difference of the two intensities. The beam having intensity $I_0(1+\cos \phi)$ is incident upon a detector 510 while the other beam is incident upon a detector 512. The detectors 510 and 512 form currents $i_1$ and $i_2$, respectively, that are indicative of the intensities of the beams incident thereon. The currents $i_1$ and $i_2$ are input to a different amplifier 514, which forms a signal indicative of the difference of the currents. The amplified difference signal is input to a current source 516, which supplies the injection current to the source 72. The injection current is then controlled by the signal fed back into the current source so that the current is either increased or decreased as necessary to adjust the output wavelength to be the desired value. The frequency of the light output by the source 72 is proportional to the injection current that the SLD source receives from the (source driven) current source 516.

FIG. 25B illustrates a modified light source control system 518 that is similar to the system 500. Light from the source 72 coupled into the fiber 80 propagates to a Mach-Zehnder interferometer 520. The Mach-Zehnder interferometer 520 comprises a coupler 524, the fiber 80, an optical fiber 526 and a coupler 528. Any type of two beam interferometer such as a Michelson interferometer (not shown) could be used instead of the Mach-Zehnder interferometer 520 shown in FIG. 25B.

The optical output of the light source 72 and is input to the interferometer 520. The portions of the fibers 80 and 526 between the couplers 524 and 528 have an optical path difference of $c\tau$, where c is the velocity of light and $\tau$ is the difference in transit times of light between the couplers 524 and 528 in the fibers 80 and 526. In order for the interferometer 520 to provide a stable reference, the optical path difference should be insensitive to changes in temperature.

The outputs of the coupler 528 are input to detectors 530 and 532, which form electrical signals $i_1$ and $i_2$, respectively, that are indicative of the intensities of the optical signals applied to the detectors 530 and 532. The currents $i_1$ and $i_2$ are then input to a differential amplifier 534, and the amplified difference signal is then input to a low pass filter 536. The output of the filter 536 is designated as $V_{LP}$. The signal $V_{LP}$ is then input to a voltage to current generator 538, which forms a current output $i_F = \alpha V_{LP}$. The current $i_F$ is the servo current that controls the injection current applied to the SLD light source 72.

The fiber 80 has a smaller refractive index for one polarization component than for the other. Since the velocity of light in the fiber 80 is $v = c/n$, where c is the speed of light in a vacuum and n is the refractive index of the fiber for the particular polarization under consideration, the two polarizations have different velocities in the fiber 14. The slow wave has velocity $v_s = c/n_1$, and the fast wave has velocity $v_f = c/n_2$, where $n_2 > n_1$. The fiber 80 converts the linearly polarized light input into an elliptically polarized wave due to superposition of the orthogonal fast and slow waves.

Referring again to FIG. 25B, the current outputs of the detectors 530 and 532 are $$i_1 = \{K_1 \int I_0(\omega)[1-\cos \omega\tau]d\omega\}\{\int I_0(\omega)d\omega\}^{-1} \qquad (12)$$

and $$i_2 = \{K_2 \int I_0(\omega)[1+\cos \omega\tau]d\omega\}\{\int I_0(\omega)d\omega\}^{-1}. \qquad (13)$$

The constants $K_1$ and $K_2$ are constants expressed in amperes and should be equal to one another for a balanced detector configuration. The output of the difference amplifier is $$V_G = G(i_1 - i_2) \qquad (14)$$
$$= G(K_2 - K_1) + \{G(K_2 + K_1)\int I_0(\omega)\cos\omega\tau d\omega\}\{\int I_0(\omega)d\omega\}^{-1}.$$

For the ideal case of the balanced configuration in which $K_1 = K_2$ and where the spectral width of the source approaches zero, the output $V_G$ of the difference amplifier is zero when $$\omega_0\tau = (N + \tfrac{1}{2})\pi, \; N = 0, 1, 2\ldots \qquad (15)$$

Using Equation (6), the interferometer output phase shift is $$\omega\tau = \omega_0\tau + \epsilon\tau - s\tau, \qquad (16)$$

where $\epsilon\tau$ is the interferometer phase shift referenced to the zero output operating point $\omega_0\tau$ and the feedback (servo) phase shift. With $\epsilon$ as the new frequency variable, Equation (4) becomes $$V_G = G(K_2 - K_1) + G(K_2 + K_1). \qquad (17)$$
$$= \int I_0(\epsilon)\cos[(N + 1/2)\pi + \epsilon\tau - s\tau]d\epsilon \{\int I_0(\epsilon)d\epsilon\}^{-1}$$
$$= G(K_2 - K_1) + G(K_2 + K_1)(-1)^N[A(\tau)\sin s\tau - B(\tau)\cos s\tau]. \qquad (18)$$

where $$A(\tau) = \int I_0(\epsilon)\cos\epsilon\tau d\epsilon\{\int I_0(\epsilon)d\epsilon\}^{-1} \qquad (19)$$

and $$B(\tau) = \int I_0(\epsilon)\sin\epsilon\tau d\epsilon\{\int I_0(\epsilon)d\epsilon\}^{-1}. \qquad (20)$$

Another form of Equation (8) is $$V_G = G(K_2 - K_1) + G(K_2 + K_1)(-1)^N[A^2(\tau) + B^2(\tau)]^{\frac{1}{2}} \sin[s\tau - \tan^{-1}(B(\tau)/A(\tau)]. \qquad (21)$$

The expression $[A^2(\tau) + B^2(\tau)]^{\frac{1}{2}}$ is a visibility function of the optical path difference of the two legs of the interferometer and source spectral distribution; $\tan^{-1}(B(\tau)/A(\tau))$ is an input phase shift referenced to the starting point given in Equation (6); and $s\tau$ is the feedback phase shift. The variables $V_\tau$, $\theta_i$, and $\theta_f$ are defined as follows:

$$V_\tau = [A^2(\tau) + B^2(\tau)]^{\frac{1}{2}} \qquad (22)$$

$$\theta_i = \tan^{-1}(B(\tau)/A(\tau) \qquad (23)$$
$$= \tan^{-1}\{[\int I_0(\epsilon)\sin\epsilon\tau d\epsilon][\int I_0(\epsilon)\cos\epsilon\tau d\epsilon]\} \qquad (24)$$

$$\theta_f = s\tau. \qquad (25)$$

The expression in Equations (22), (23), (24) and (25) are all functions of time. Substituting them into Equation (21) gives $$V_G(t) = G(K_2 - K_1) + G(K_2 + K_1)(-1)^N V_\tau(t) \sin[\theta_f(t) - \theta_i(t)]. \qquad (26)$$

The input to the low band pass filter 536 of FIG. 25B is $V_G(t)$, and the output across the capacitor C is $V_{LP}(t)$. The node equation connecting both voltages is $$(1/R)[V_G(t) - V_{LP}(t)] = C \, d/dt[V_{LP}(t)]. \qquad (27)$$

The voltage VLP is the input to the voltage to current converter 538 which produces an output current $$i_f = -\alpha V_{LP}. \qquad (28)$$

(28) In terms of the feedback current, the voltage output of difference amplifier 534 is $$V_G(t) = -RC\alpha^{-1}d/dt[i_f(t)] - \alpha^{-1}i_f(t). \qquad (29)$$

The feedback current produces a feedback phase shift from the source phase due to the servo change in source frequency. From Equations (24) and (25) this phase shift is $$\theta_f(t) = s(t)\tau = \beta i_f(t), \qquad (30)$$

and the difference amplifier output is $$V_G(t) = -RC(\alpha\beta)^{-1}d/dt[\theta_f(t)] - (\alpha\beta)^{-1}\theta_f(t). \qquad (31)$$

The complete servo equation relating the input and feedback phase shift is obtained from Equations (24) and (30).

$$d/dt\theta_f(t) + (RC)^{-1}\theta_f(t) = (RC)^{-1}(\alpha\beta G)[(K_2 - K_1) + G(K_2 + K_1)(-1)^N V_\tau(t)\sin(\theta_f(t) - \theta_i(t))]. \qquad (32)$$

Equation (32) is a non-linear differential equation. Some approximations are made to make it more tractable. The visibility function $V_\tau$ is usually very weakly influenced by changes in source spectral range and may therefore be considered to be constant. If the servo tracks well, the feedback phase shift minus the input phase shift, $\theta_f - \theta_i$, is much smaller than one radian, which means that $\sin(\theta_f(t) - \theta_i(t)) = (\theta_f(t) - \theta_i(t))$. The $(-1)^N$ term indicates the polarity of the fringe order with respect to the servo feedback. Choosing the proper polarity of $\alpha$ or G eliminates uncertainty due to that term. The linearized form of Equation (32) is $$d/dt\theta_f(t) + (1 + X)T^{-1}\theta_f(t) = XT^{-1}[\theta_i(t) - V_\tau^{-1}(K_2 - K_1)(K_2 + K_1)^{-1}] \qquad (33)$$

where $$\theta_i(t) = \tan^{-1}\{[\int I_0(\epsilon)\sin\epsilon\tau d\epsilon][\int I_0(\epsilon)\sin\epsilon\tau d\epsilon]^{-1}\} \qquad (34)$$

$$\theta_f(t) = s(t)\tau \qquad (35)$$

$$T = RC \qquad (36)$$

$$X = \alpha\beta G(K_2 + K_1)V_{96}. \qquad (37)$$

The driving term in Equation (33) is $\theta_i(t)$. Its time dependence is implicit in the term $I_0(\epsilon)$, which is a function of time.

The steady state solution of Equation (33) is obtained for a constant value of $\theta_i(t)$.

$$\theta_f = (1 + X)^{-1}X[\theta_i(t) - (K_2 - K_1)(K_2 - K_1)^{-1}V_\tau^{-1}]. \qquad (38)$$

As the overall gain X becomes large, the feedback phase shift and the input phase shift minus an offset approach one another such that the difference between them becomes very small and the servo tracks closely.

Another solution to Equation 33 is obtained for a sinusoidal input in which $$\theta_i(t) = \phi_0 \sin\Omega t. \qquad (39)$$

In this case the phase $\theta_f$ is $$\theta_f(t) = [(\Omega t)^2 + (1+X)^2]^{\frac{1}{2}} \sin\{\Omega t - \tan^{-1}[\Omega t(1+X)^{-1}] - X(K_2-K_1)[V_T(1+X)\cdot(K_2+K_1)]^{-1}\}. \quad (40)$$

For high frequencies $\Omega t$ is much larger than the overall gain X, and the AC feedback phase correction approaches zero. For low frequencies, X is much larger than $\Omega t$, and an expression for $\theta_f(t)$ similar to that of Equation (38) is obtained.

$$\theta_f(t) \approx X(1+X)^{-1}\{\phi_c \sin \Omega(t-T/X) - (K_2-K_1)[V_T(K_2=K_1)]^{-1}\} \quad (41)$$

It should be noted that $\theta_f(t) - \theta_i(t)$ approaches zero as the overall gain X becomes much larger than one.

Figure 26:
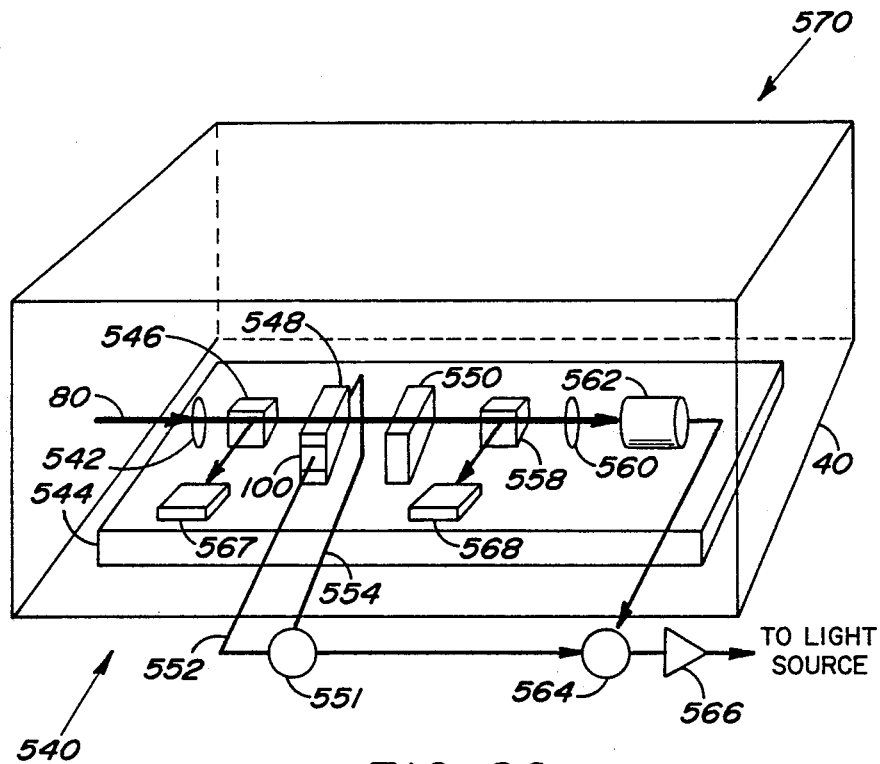
FIG. 26 schematically illustrates a thermally compensated reference interferometer device for stabilizing an optical signal source included in the system of FIG. 12.
Figure 27:
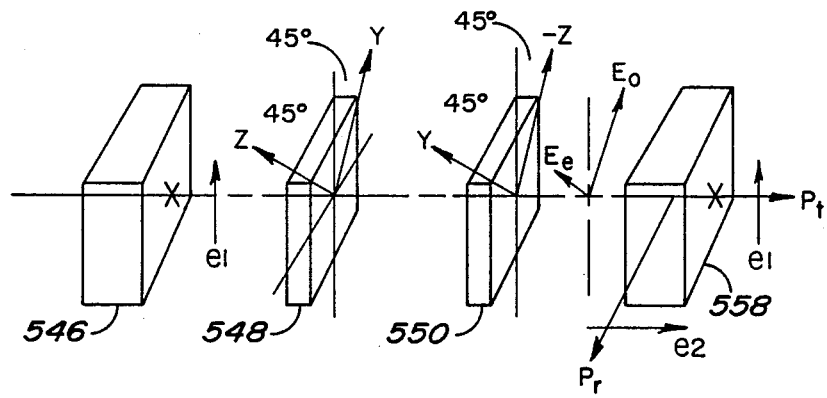
FIG. 27 schematically illustrates orientation of crystals in the thermally compensated reference interferometer of FIG. 26 relative to the polarization of the incident light.

Referring to FIGS. 26 and 27, a thermally compensated reference interferometer 540 that may be used to stabilize the optical source includes a lens 542 that receives light from an optical fiber 80. Light is input to the fiber 80 by the optical source 72, shown in FIG. 22. The lens 542 is mounted on a baseplate 544. The lens 542 focuses the light onto a polarizing beamsplitter 546, which is also mounted on the baseplate 544. The polarizing beamsplitter 546 is preferably a bulk optics device for polarizing an optical input at 45° to the optic axis. The optic axis is conveniently defined as a line collinear with the light beam input from the fiber 80.

Light transmitted straight through the polarizing beamsplitter 546 impinges upon a first crystal 548 that is mounted to the baseplate 544. Light transmitted through the crystal 548 impinges upon a second crystal 550 mounted on the baseplate 544 near the crystal 548. Although other materials may be used the crystal 548 is preferably formed of lithium niobate, and the crystal 550 is formed of lithium tantalate. Both of these crystals 548 and 550 are birefringent electrooptically active materials.

Referring still to FIG. 26, a pair of electric leads 552 and 554 are connected to the crystal 548. Although several other pairs of crystals would satisfy the temperature stability requirements of the reference interferometer 540, electro-optic crystals are preferred to provide a discriminant for phase-sensitive detection. This discriminant is obtained by applying an alternating voltage from an oscillator 551 to the crystal 548 to modulate the phase of the optical wave transmitted therethrough.

Light transmitted through the crystal 550 is then input to a second polarizing beamsplitter 558 mounted to the baseplate 544. The polarizing beamsplitter 558 polarizes the input light along a line at 45° to the optic axis. Light transmitted straight through the polarizing beamsplitter 558 then impinges upon a lens 560, which focuses the light onto a detector 562 that is also mounted on the baseplate 544. A pair of absorbers 567 and 568 receive the light rejected by the polarizers 546 and 558, respectively. These absorbers 567 and 568 prevent the rejected light from having any effect on the signal input to the detector 562.

The baseplate 544 and all the components mounted thereon are preferably enclosed in a hermetically sealed container 570.

For an optical beam polarized at 45° to the optic axis of the lithium niobate crystal 548 and lithium tantalate crystal 550, the phase difference between the two orthogonally polarized components is $$Y = 2\pi S/\lambda \quad (42)$$

where $\lambda$ is the wavelength of the source. The optical pathlength difference, S, between the two polarizations propagating in the crystals, is $$S = L_1 B_1 - L_2 B_2 \quad (43)$$

where $L_1$, $L_2$ and $B_1$, $B_2$ are the lengths and birefringences of crystals 548 and 550, respectively. The birefringence is the difference in refractive indices for waves of different polarizations.

For a thermally insensitive reference interferometer, the temperature derivative of the phase difference, Y, must be zero. Since the crystals 548 and 550 are birefringent, propagation of the light through them causes a phase change between the two polarization components. Differentiating Equation (42) with respect to temperature and setting the result equal to zero gives $$L_1/L_2 = K_2 B_2 / K_1 B_1 \quad (44)$$

where $$K_i = (1/B_i)dB_i/dt + (1/L_i)dL_i/dt \quad (45)$$

is the sum of the normalized rate of change of birefringence with temperature and the thermal expansion coefficient of each crystal and where $X_i$, i=1,2.

The lengths of the crystals 548 and 550 in the reference interferometer 540 are subject to the restriction imposed by the spectral bandwidth of the source. That is, for good fringe visibility in the interferometer 540 the optical path difference between the two polarizations must be less than the coherence length of the source, $X_{coh}$. This criterion sets an upper limit on the total length of the crystals 548 and 550 in the interferometer 540. Using Equation (44) and the requirement that the optical pathlength difference be less than the coherence length of the source, an upper limit on the absolute lengths of the crystals 548 and the source, an upper limit on the absolute lengths of the crystals 548 and 550 is obtained. For the crystal 548, the upper length limit is $$L_1 < X_{coh}/[B_1(1-K_1/K_2)] \quad (46)$$

Figure 28:
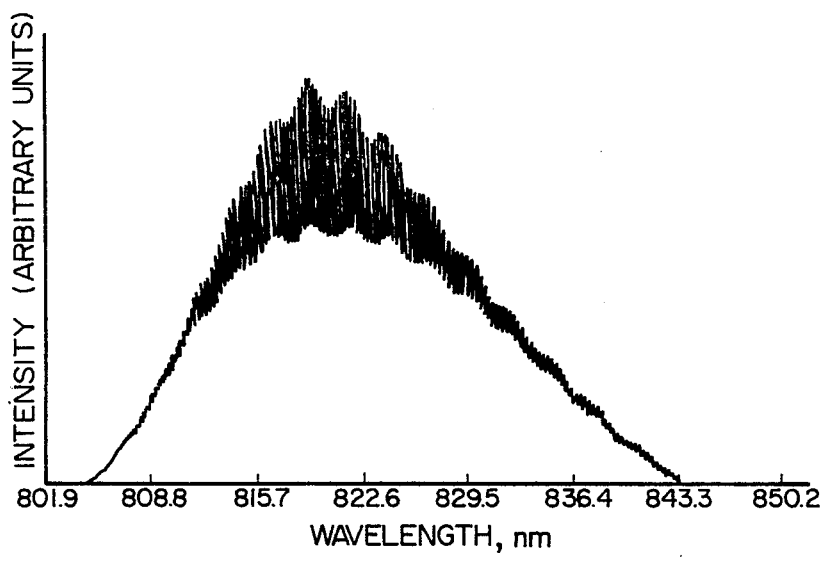
FIG. 28 graphically illustrates the spectrum of a typical superluminescent diode used as an optical source in a fiber optic gyroscope.

FIG. 28 illustrates the spectrum of a typical SLD. The SLD has a 57 μm coherence length and a center wavelength of 820 nm. The maximum length of the lithium niobate crystal 548 is therefore 635 μm. From the length ratio $L_1/L_2 = 1.092$ as determined from Equation (44), the maximum length of the lithium tantalate crystal 550 is 582 μm. Thus, the maximum combined length of the two crystals 548 and 550 in the interferometer 540 is 1.217 mm.

Figure 29:
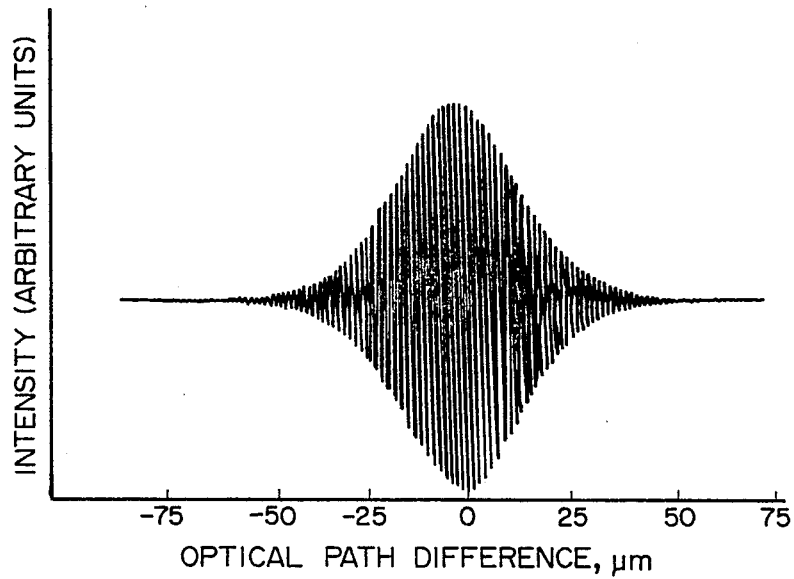
FIG. 29 graphically illustrates the visibility of the interference pattern produced by the thermally compensated reference interferometer of FIG. 26 as a function of the optical path difference in the interferometer.
Figure 30:
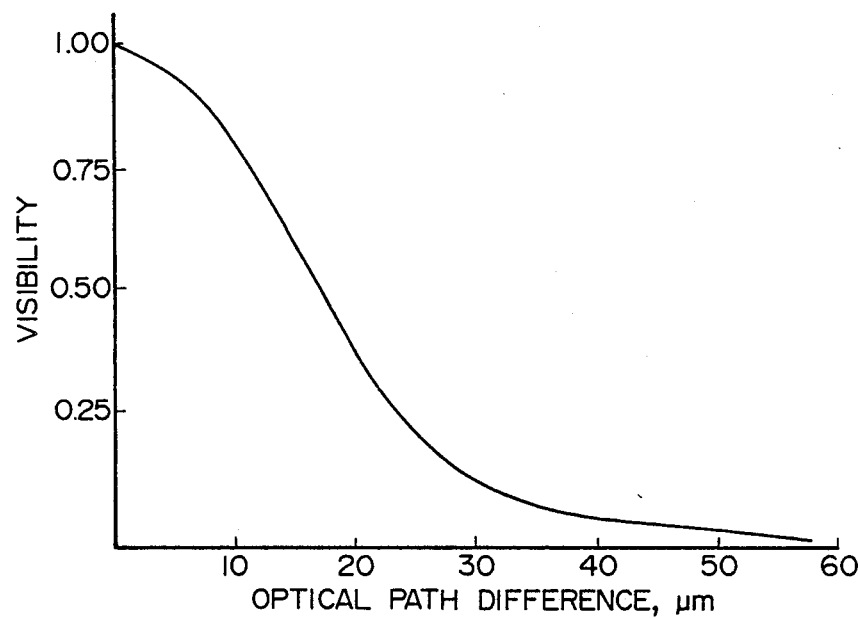
FIG. 30 graphically illustrates the output of the thermally compensated reference interferometer of FIG. 1.

FIG. 29 illustrates the output of the interferometer 540 for light input from an SLD as a function of the optical path difference. FIG. 30 illustrates the visibility of the interference pattern as a function of the optical path difference.

Optimization of the signal to noise ratio to facilitate signal processing requires that the fringe visibility in the interferometer 540 be close to unity. Therefore, the interferometer 540 is designed to have an optical path difference of 8.2 μm and is fixed on the tenth fringe from zero pathlength difference. Making the optical path difference between the two orthogonal polarizations an integral number of wavelengths ensures that the throughput of the second polarizer 558 is a maximum when it is aligned parallel to the polarizer 546. For the 8.2 μm optical path difference the lengths of the two crystals 548 and 550 are 91 μm and 84 μm, respectively. The requirements of crystal dimensions and tolerances, although not routine, are within the capabilities of crystal vendors.

Figure 31:
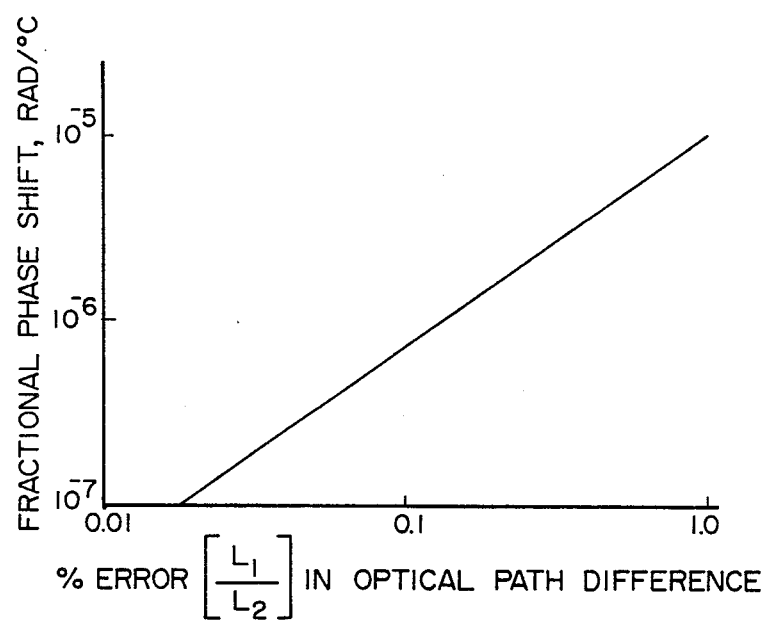
FIG. 31 graphically illustrates the fractional phase shift per °C. as a function of the ratio of the lengths of the crystals included in the thermally compensated reference interferometer of FIG. 26.
Figure 33:
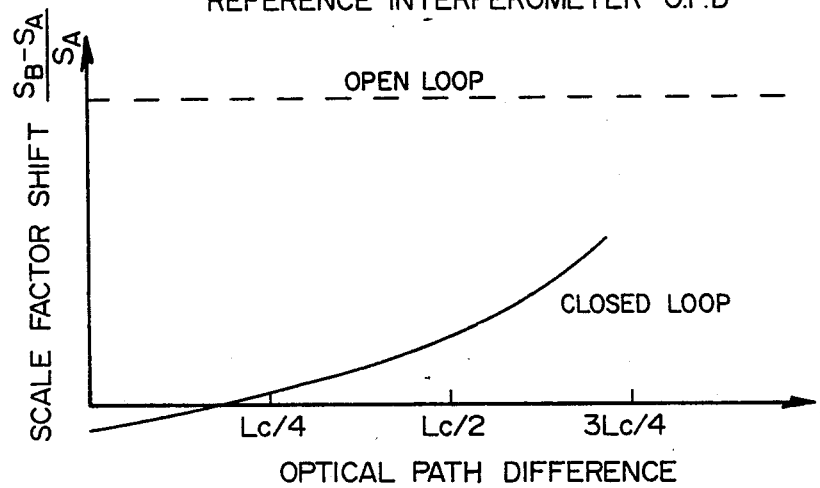
FIG. 33 graphically represents the stabilization of scale factor of a fiber optic rotation sensor versus the optical path difference in the reference interferometer.
Figure 34:
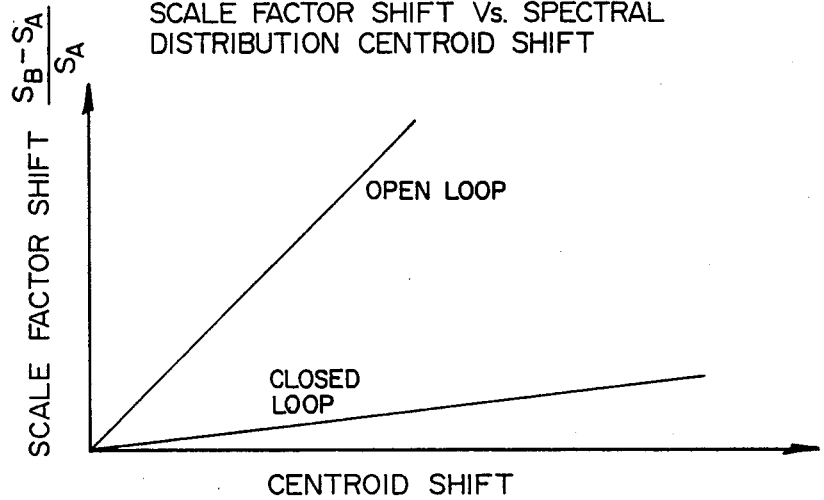
FIG. 34 graphically illustrates the shift of the scale factor of a fiber optic rotation sensor versus the shift of the centroid of the spectral distribution of the optical source.

FIG. 31 is a plot of the fractional phase shift per °C., [(dγ/dT)/Y], as a function of the length ratio $L_1/L_2$. For a 1% error in the length ratios, which corresponds to an error of ±0.5 μm in absolute lengths of the crystals 548 and 550, the fractional phase shift per °C. in the interferometer 540 is 3.3 ppm/°C. By controlling the crystal temperatures to ±0.5° C, the phase shift in the interferometer 540 can be held to within 3 ppm, which is necessary for holding the wavelength constant to the required 10 ppm.

Referring to FIG. 27, the electric field for a quasi-mono-chromatic light wave, $E_i$, polarized parallel to $e_1$ and incident on the birefringent crystal 548 is $$E_i(x,t) = e_1 E_o \cos(Kx - \omega t) \tag{47}$$

where $K = 2\pi/\lambda$ is the wave number, $\omega$ is the angular frequency of the wave in radians per second, and x and t are the displacement and time coordinates, respectively. The optic axes of the two crystals 548 and 550 are aligned parallel to each other and at 45° to the polarization of the incident wave. The wave exiting the crystal 550 and directed to the lens 560 include two orthogonal components shifted in phase with respect to each other. The field distributions for the ordinary and the extraordinary polarizations are $$E_o = E \cos(k_{o1} L_1 + k_{o2} L_2 - \omega t) \tag{48}$$

and $$E_e = E \cos(k_{e1} L_1 + k_{o2} L_2 - \omega t) \tag{49}$$

respectively. $L_1$ and $L_2$ are the lengths of the crystals 548 and 550, respectively, and $k_o$ and $k_e$ are the wave numbers of the ordinary and extraordinary waves in the crystals. The polarizing beamsplitter 556 is oriented so that the polarization of the transmitted wave is parallel to $e_1$.

$$P_t = \frac{P_o[1 + V\cos(Y)]}{2} \tag{50}$$

and $$P_r = \frac{P_o[1 - V\cos(Y)]}{2} \tag{51}$$

$P_o$ is the square of the field amplitude, $E_o$. For a broad bandwidth source such as an SLD, the cosine functions in Equations (50) and (51) are multiplied by the fringe visibility function, V. For an SLD with a 10 nm spectral bandwidth, the visibility function monotonically decreases from a maximum value of one at zero optical path difference to zero at approximately 60 μm as shown in FIG. 30. The design of the interferometer 540 maximizes the transmitted power, $P_t$, from Equation (50), and makes the reflected power, $P_r$, vanishingly small by making the optical path difference of the interferometer an integral number of wavelengths. For an SLD with a center wavelength of 820 nm as shown in FIG. 28, the interferometer 540 has an optical path difference of 8.2 μm.

A discriminant for phase-sensitive detection of the wavelength shifts in the SLD is obtained by electro-optically modulating the phase retardation in the lithium niobate crystal 548. This crystal 548 is x-axis cut, and electrode 100 is bonded to an x-z facet as shown in FIG. 26. Another electrode (not shown) similar to the electrode 100 is mounted to the other x-z facet. In this configuration, use is made of the large $r_{42}$ electro-optic coefficient to reduce the voltage required to achieve the desired phase shift in the crystal 548. Using accepted values for $n_o = 2.2598$, $r_{42}$ ($32 \times 10^{-12}$) m/V, and $r_{22}$ ($6.8 \times 10^{12}$), the scale factor for the 91 μm long lithium niobate crystal 20 is 0.1 rad m/V.

To minimize the applied voltage, the optical beam inside the interferometer 540 is soft-focused to a beam radium of 18 μm with a Rayleigh range of 1.0 mm, which is approximately 5 times the interferometer length. This relatively large Rayleigh range ensures a near planar wavelength over the 175 μm long interferometer. The crystal 548 and 550 are cut to a 250 μm square cross-section in the y-z plane, which is large enough to accommodate the focused optical beam without any appreciable diffraction effects. With this 250 μm separation between the electrodes on the x-z facets of the lithium niobate crystal, the scale factor is 0.44 milliradian per volt.

The phase difference of the two polarizations optical wave in the interferometer can be varied by applying an electric field to the electrooptic crystal 548. A sinusoidal electric field of amplitude $E_y$ and angular frequency $\omega$ will modulate the phase difference and provide a discriminant for phase sensitive detection.

From Equation (50) the power transmitted through the polarizing beamsplitter 558 is $$P_t = P_o[1 + V\cos(Y + Z\cos\omega t)] \tag{52}$$

where Y, given by Equation (52), is the phase retardation in the interferometer 540 in the absence of the electric field applied to the crystal 548, and Z is the electrically induced phase retardation.

Since by design Y is an integral multiple of $2\pi$, the phase of the optical throughout is modulated about a maximum. Wavelength shifts in the emission spectrum of the SLD are detected as a signal at the fundamental of the modulation frequency $\omega$.

When the source stabilization system 540 shown in FIG. 26 is activated, the phase shift, F, induced by the crystals 548 and 550 opposes the phase shift errors, y, induced by the drift in the emission wavelength of the SLD. The transmitted power, $P_t$, is then $$P_t = P_o[1 + V\cos(y - F + Z\cos\omega t)]. \tag{53}$$

Expanding Equation (11) gives a Bessel function series $$P_t = P_o + P_o[J_o(Z)\cos(y-F) + J_1(Z)\sin(\omega t)\sin(y-F) + J_2(Z)\cos(\omega t)\cos(y-F) + \ldots \tag{54}$$

The servo system processes all information in the spectral vicinity of $\omega$ and ignores all other terms. The effective input signal to the servo system from Equation (54) is $$P_t(eff) = P_o J_1(Z)\sin(\omega t)\sin(y - F) \tag{55}$$

Referring again to FIGS. 26, an output signal of frequency $\omega$ from the oscillator 551 is input to a mixer 564, which also receives the electrical signal from the photodetector 562. The effective input signal given by Equation (55) is mixed with the local oscillator signal of frequency ω from the oscillator 557. The output of the mixer 564 is then low pass filtered and amplified by the amplifier 566. The output of the amplifier 566 is the feedback signal which is used to stabilize the emission wavelength of the SLD, and is given by $$FB = P_o A \sin(y - F), \quad (56)$$

where A represents the electronic gain of the amplifier 566 which is connected between the interferometer 540 and the source 72. The signal FB is input to the optical source 72 to control the frequency of the emitted light signal. In a solid state light source, the signal FB controls the injection current. The frequency stabilization apparatus of the invention may be used with gas discharge lasers (not shown), in which case the signal FB controls the length of the resonant cavity in which the discharge occurs.

The object of the feedback signal is to produce a phase shift, F, which cancels the phase shift y. The ability of the feedback phase shift to track the phase shift, y, induced by changes in the source wavelength is determined by the loop gain of the amplifier 566. The loop gain for the servo system described is preferably large enough (>100) so that y−F is always less than 0.1 radians. In this case, the sin (y−F) term in Equation (54) can be approximated by (y−F) with negligible error. The servo system thus operates over a linear range, and parameters that provide the wavelength stabilization are:

$P_o = 10 \ \mu W$
G = loop gain (in radians) = 200 or greater
BW = loop bandwidth = 100 Hz
Y = loop bandwidth = 100 Hz
Z = peak phase modulation amplitude = 0.1 radians
d = servo system damping ratio > 0.5

Under the above operating conditions the wavelength stabilization system 10 maintains a source wavelength stability of better than 10 ppm.

Changes in the temperature of the optical signal source change the output wavelength. It is possible to control the wavelength output of the source 72 by controlling its temperature. The base plate 544 is preferably formed of a material that exhibits the Peltier effect and the light source is mounted on the baseplate in thermal contact therewith. The phase change caused by the crystals 548 and 550 opposes the change in phase caused by temperature changes. Therefore, using the feedback signal to control the thermoelectric heater permits control of the source wavelength.

Figure 8:
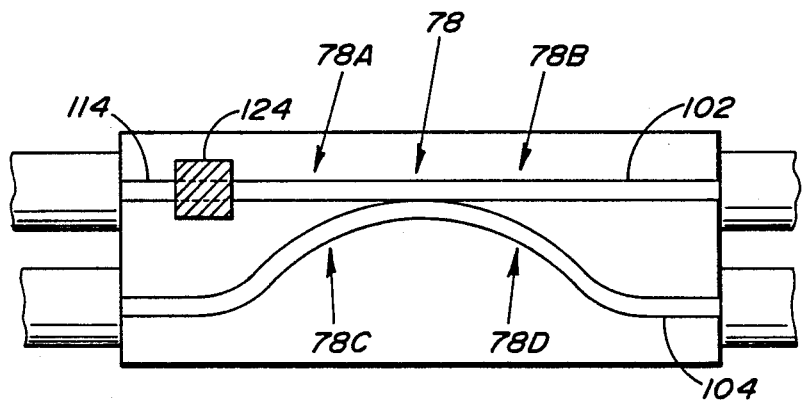
FIG. 8 is a plan view showing a mask formed to cover a portion of the substrate of FIG. 3 and a portion of one of the lengths of optical fiber mounted to the substrate.

Prior to deposition of the dielectric stacks 125, the substrate and fibers are preferably masked as shown in FIG. 8. A mask 124 prevents deposition of the layers of the dielectric stack on part of the substrate where the reciprocity polarizer 86 is to be located. The dielectric stack is deposited everywhere on the fiber 74 except the area of the mask 124.

Figure 9:
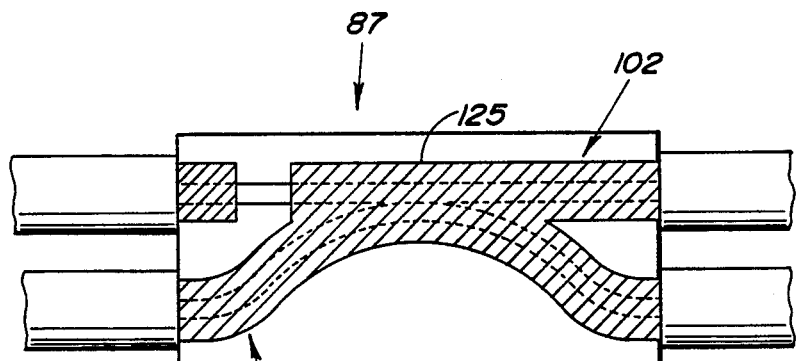
FIG. 9 is a plan view showing a dielectric stack formed on the substrate of FIG. 8.
Figure 10:
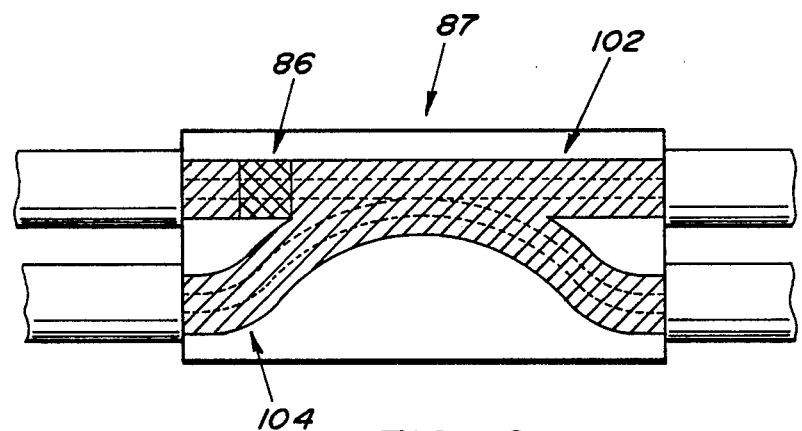
FIG. 10 is a plan view showing a pair of dielectric stacks and a polarizer formed on the substrate of FIG. 8.

After deposition of the form birefringent polarizer 75, the mask 124 is removed, and the form polarizer remains on the silica substrate 76 is as shown in FIG. 9. Next the polarizer 86 is formed by depositing a metal layer, a dielectric layer or layers (buffers) followed by a metal layer or a second dielectric stack on the substrate as shown in FIG. 10. Only the portion which deposits on the bare, polished fiber where the mask 124 had been will change the polarization of the optical wave in the fiber. The reciprocity polarizer 86 functions properly only if the initial dielectric stack 125 has a thickness greater than about 1.5 mm. If the dielectric stack 125 is not thick enough it then must be masked to limit the subsequent depositions to the bare region of the polished fiber. FIG. 10 shows the substrate after deposition of the dielectric stack 125 and the polarizer 86. Finally the deposited dielectric or metal stacks are overcoated with a substance such as silicon nitride to prevent contamination.

Figure 11:
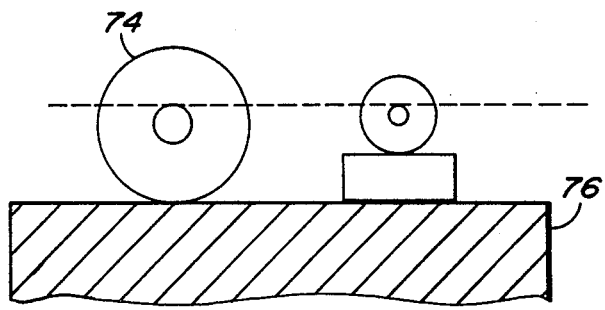
FIG. 11 is a cross sectional view of the substrate and fibers of FIG. 8 showing a method of attaching fibers of different diameter to the substrate.

The fiber 74, which is bonded to the substrate 76, need not be of uniform diameter. The process described above will allow the use of fibers which have biconical tapers. Such tapers can be used to optimize the performance of the polarizer 86. For example, if non-uniform diameters are used, then extra jigging is needed to locate the upper surface edge of the core/cladding boundary at the same or known levels as shown in FIG. 11. Such jigging could be made by ion milling or anisotropic etching of silicon wafers.

III. ADVANTAGES OF THE INVENTION:

This invention has advantages over the prior art. These include:

1. The form birefringence induced by the dielectric stacks can be made quite large ($\Delta n \geq 0.1$), which is larger than that of $LiNbO_3$. This leads to a short depolarization length, which means a smaller degree of polarization since competing effects have a shorter length in which to build up. The result is improved bias performance and reduced polarizer extinction ratio requirements.

2. The fiber can be made to guide a single polarization (orthogonal polarization radiates). The use of polarization maintaining fiber reduces further the amount of non reciprocal light which can interfere with the reciprocal light in the gyroscope. The bias performance is again improved and the polarizer extinction ratio requirement is reduced.

3. The birefringent axis of the fiber 74 on the substrate 76 is self aligned with the transmission axis of the reciprocity polarizer 86 by the polishing and deposition process. Self alignment of one arc-sec or less should be realizable with conventional polishing techniques. This alignment reduces the amount of nonreciprocal light that can interfere with the reciprocal light in the gyroscope. Bias error and polarizer extinction ratio requirements are reduced.

4. The ability to create controlled artificial birefringence using dielectric stacks permits mode matching between the fiber mode and the polarizer stack, thereby increasing extinction ratio. This is true whether the fiber is polished into the core or only near the core. Also thermal matching between the polarizer stack and the fiber can be accomplished, thereby permitting fabrication of a thermally stable polarizer.

5. The fiber used in the sensing loop can be commercial single mode fiber, thereby reducing cost.

6. Conventional polarization stabilization devices can be used in the loop and prior to the module. Examples are active controllers, continuous and discrete depolarizers and polarization maintaining fiber. The sole purpose of these devices now is solely maintenance of the signal strength (i.e. no signal fading). They do not reduce the bias in the fiber optic rotation sensor formed according to the present invention. This is all done by the module. This allows the use of simpler active servos, lower quality depolarizers, or poor quality PM fiber (extinction ratio less than 10 dB). This simplifies the system and reduces the life cycle costs.

7. Because this process uses many of the techniques of integrated optics and electronics, the modules can be made by batch processes, thereby reducing cost and fabrication time.

IV. METHOD OF OPERATION

Having described the gyroscope system and the various components thereof, the method of operation of the fiber optic gyroscope will be described in detail.

The clockwise optical wave passes through the phase modulator in a time interval, t, which causes a phase shift of $f_m \sin(\omega_m t)$ where $f_m$ and $\omega_m$ are the amplitude and frequency, respectively, of the signal output by the phase modulator 88. The frequency shifter 92 shifts the frequency of the clockwise wave from $f_o$ to $f_o + \Delta f$ and changes the polarization of the clockwise wave from y to x as described with reference to FIGS. 16 and 17. The clockwise wave next passes through the directional coupler 87, the polarizer 86 and the directional coupler 78 to produce a signal incident upon the photodetector 96. The total phase change of the clockwise wave incident upon the photodetector is given by $$f_{cw} = \tfrac{1}{2}f_s + f_m \sin\omega_m t + 2\pi f_o T \quad (57)$$

where $f_o$ is the source frequency and T is the propagation time around the loop and $f_s$ is the Sagnac phase shift.

The frequency of the counterclockwise wave becomes $f_o + \Delta f$ after passage through the frequency shifter. The frequency shifter also changes the polarization of the counterclockwise wave from x to y. The counterclockwise wave passes through the phase modulator at a time $t+T$ where T is defined above. The counterclockwise wave undergoes a phase shift of $f_m \sin[\omega(t+T)]$ in the phase modulator. The counterclockwise wave propagates through the directional coupler 87, the linear polarizer 86 and the directional coupler 78 to the photodetector 96. The total phase of the counterclockwise wave is $$f_{ccw} = -\tfrac{1}{2}f_s + f_m \sin\omega_m(t+T) + 2\pi(f_o+\Delta f)T \quad (57)$$

where the variables have been previously defined. The photocurrent of electrical signal, S, from the detector, which is preferably a photodiode, with both the clockwise and counterclockwise waves being incident on it is $$S = \tfrac{1}{2}S_o(1 + \cos(f_{cw} - f_{ccw})) \quad (58)$$

where S is an amplitude constant.

By picking $\omega_m = \pi/T$, the signal of Equation (58) becomes $$S = \tfrac{1}{2}S_o(1 + \cos(f_s + 2\pi\Delta fT + 2f_m \sin\omega_m t)). \quad (59)$$

The Sagnac phase shift in terms of system parameters becomes $$2\pi L\Delta\Omega/(\lambda c) = -2\pi\Delta f nL/c \quad (60)$$

and hence $\Omega = -\lambda n\Delta f/D$, where $\lambda$ is the free space source wavelength, n is the effective refractive index of the guided mode and D is the diameter of the sensing loop, $\Omega$ is the input rotation rate of the sensing loop and c is the free space velocity of light.

The essential operational features are that the clockwise and counterclockwise waves traverse identical optical paths, including the same polarization path, and that the frequency shift $\Delta f$ is adjusted to null the phase difference between the clockwise and counterclockwise waves when they recombine in the directional coupler. The rate of rotation may then be determined by the amount of frequency shift required to achieve the desired null phase difference. All that is necessary for finding the rotation rate are the source wavelength, the effective refractive index of the guided mode in the fiber, and the diameter of the sensing loop.

Although the present invention has been described with reference to specific embodiments, it should be understood that these embodiments are exemplary preferred embodiments and that modifications may be made without departing from the scope of the invention as defined in the appended claims.

What is claimed is:

1. A fiber optic rotation sensor, comprising:
    a substrate;
    a first optical fiber having a central core and a surrounding cladding, a length of the first optical fiber having a portion of the cladding removed therefrom to form a first planar cladding surface thereon, the length of the first optical fiber being mounted to the substrate;
    a second optical fiber having a central core and a surrounding cladding, a length of the second optical fiber having a portion of the cladding removed therefrom to form a second planar cladding surface thereon, the length of the second optical fiber being mounted to the substrate;
    a first optical coupler formed between the first and second optical fibers;
    means for introducing an optical signal into the first optical fiber;
    a reciprocity polarizer formed on the planar cladding surface of the first optical fiber, the polarizer having a transmission axis aligned with an axis of birefringence of the first optical fiber to interact with the first optical fiber to remove an undesired linear polarization component from optical signals guided by the first optical fiber while permitting a desired linear polarization component to propagate unattenuated in the first optical fiber; and
    a sensing coil of optical fiber arranged to guide light between the first and second optical fibers, the first and second optical fibers and the optical coupler cooperating to introduce counterpropagating light waves in the sensing coil.

2. The fiber optic rotation sensor of claim 1, further comprising:
    a third optical fiber having a central core and a surrounding cladding, a length of the third optical fiber having a portion of the cladding removed therefrom to form a third planar cladding surface thereon, the length of the third optical fiber being mounted to the substrate;
    a second optical coupler formed between the first and third optical fibers such that the polarizer is between the first and second optical couplers; and
    means for stabilizing the frequency of the optical signal.

3. The fiber optic rotation sensor of claim 2, further comprising:
    a first form birefringent polarizer formed on the substrate and the first cladding surface such that the first optical coupler is between the first form birefringent dielectric stack and the reciprocity polarizer; and a second form birefringent polarizer formed on the first cladding surface such that the second optical coupler is between the second form birefringent polarizer and the reciprocity polarizer.

4. The fiber optic rotation sensor of claim 1 wherein the first optical fiber is a polarization maintaining fiber.

5. The fiber optic rotation sensor of claim 1 wherein the reciprocity polarizer comprises at least one layer of a material deposited on the first planar cladding surface such that the polarizer transmission axis is self aligned with the axis of birefringence of the first fiber.

6. The fiber optic rotation sensor of claim 5 wherein the reciprocity polarizer comprises a plurality of dielectric layers of different refractive index.

7. The fiber optic rotation sensor of claim 5 wherein the reciprocity polarizer comprises:
a core surface formed at a location on the first optical fiber from which all of the cladding and a portion of the core have been removed; and
a form birefringent polarizer placed on the core surface.

8. The fiber optic rotation sensor of claim 5 wherein the reciprocity polarizer comprises:
a core surface formed at a location on the first optical fiber from which all of the cladding and a portion of the core have been removed; and
a metal film formed on the core surface.

9. The fiber optic rotation sensor of claim 8 wherein the reciprocity polarizer further comprises a dielectric layer between the metal layer and the core surface.

10. A method for forming a fiber optic rotation sensor, comprising the steps of:
forming a substrate;
mounting a first optical fiber having a central core and a surrounding cladding on the substrate;
removing a portion of the cladding from a length of the first optical fiber to form a first planar cladding surface thereon;
mounting a second optical fiber having a central core and a surrounding cladding on the substrate;
removing a portion of the cladding from a length of the second optical fiber to form a second planar cladding surface thereon;
forming a first optical coupler between the first and second optical fiber;
introducing an optical signal into the first optical fiber;
forming a reciprocity polarizer on the planar cladding surface of the first optical fiber so that the reciprocity polarizer has a transmission axis aligned with an axis of birefringence of the first optical fiber to interact with the first optical fiber to remove an undesired linear polarization component from optical signals guided by the first optical fiber while permitting a desired linear polarization component to propagate unattenuated in the first optical fiber; and
arranging a sensing coil of optical fiber to guide light between the first and second optical fibers, the first and second optical fibers and the optical coupler cooperating to introduce counterpropagating light waves in the sensing coil.

11. The method of claim 10, further comprising the steps of:
mounting a third optical fiber having a central core and a surrounding cladding to the substrate;
removing a portion of the cladding from a length of the third optical fiber to form a third planar cladding surface thereon;
forming a second optical coupler between the first and third optical fibers such that the polarizer is between the first and second optical couplers; and
stabilizing the frequency of the optical signal connected between the second optical coupler and the optical signal source.

12. The method of claim 11, further comprising the steps of:
forming a first form birefringent polarizer on the substrate and the first cladding surface such that the first optical coupler is between the first form birefringent polarizer and the first reciprocity polarizer; and
forming a second form birefringent polarizer on the first cladding surface such that the second optical coupler is between the second form birefringent polarizer and the second reciprocity polarizer.

13. The method of claim 10 including the step of forming the first optical fiber from a polarization maintaining fiber.

14. The method of claim 10 including the step of forming the reciprocity polarizer to have at least one layer of a material deposited on the first planar cladding surface such that the polarizer transmission axis is self aligned with the axis of birefringence of the first fiber.

15. The method of claim 14 including the step of forming the reciprocity polarizer to comprise a plurality of dielectric layers of different refractive indicies.

16. The method of claim 14 including the steps of:
forming a core surface at a location on the first optical fiber from which all of the cladding and a portion of the core have been removed; and
placing a form birefringent polarizer on the core surface.

17. The method of claim 14 including steps of:
forming a core surface formed at a location on the first optical fiber from which all of the cladding and a portion of the core have been removed; and
forming a metal film on the core surface.

18. The method of claim 17 including the step of forming the reciprocity polarizer to comprise a dielectric layer between the metal layer and the core surface.

19. The fiber optic rotation sensor of claim 1, further comprising means for stabilizing the frequency of the optical signal of the means for introducing an optical signal into the first optical fiber

* * * * *